(12) United States Patent
Sanders et al.

(10) Patent No.: US 12,240,604 B2
(45) Date of Patent: Mar. 4, 2025

(54) METALLIC STRUCTURES WITH ADDITIVELY MANUFACTURED METALLIC ARTICLES AND METHODS FOR FABRICATION

(71) Applicant: The Boeing Company, Chicago, IL (US)

(72) Inventors: Daniel G. Sanders, Cle Elum, WA (US); Justin L'Hote, St. Peters, MO (US); Eric D. Bol, Lake Stevens, WA (US); Cory C. Cunningham, Auburn, WA (US)

(73) Assignee: The Boeing Company, Arlington, VA (US)

( * ) Notice: Subject to any disclaimer, the term of this patent is extended or adjusted under 35 U.S.C. 154(b) by 158 days.

(21) Appl. No.: 17/688,180

(22) Filed: Mar. 7, 2022

(65) Prior Publication Data
US 2023/0278696 A1    Sep. 7, 2023

(51) Int. Cl.
*B32B 3/00*        (2006.01)
*B22F 7/08*        (2006.01)
(Continued)

(52) U.S. Cl.
CPC .......... *B64C 9/24* (2013.01); *B22F 7/08* (2013.01); *B33Y 80/00* (2014.12); *F01D 25/24* (2013.01); *F05D 2220/36* (2013.01)

(58) Field of Classification Search
None
See application file for complete search history.

(56) References Cited

U.S. PATENT DOCUMENTS

| 4,217,397 A | 8/1980 | Hayase et al. |
| 5,083,426 A * | 1/1992 | Layland ............ F02K 1/78 |
| | | 428/116 |

(Continued)

FOREIGN PATENT DOCUMENTS

| EP | 2 792 436 | 10/2014 |
| GB | 845003 | 8/1960 |
| WO | WO 97/27045 | 7/1997 |

OTHER PUBLICATIONS

George Genevro, Stainless Steel: A metal for all seasons, Feb. 1, 2003 (Year: 2003).*

(Continued)

*Primary Examiner* — Mary I Omori
(74) *Attorney, Agent, or Firm* — Walters & Wasylyna LLC

(57) ABSTRACT

A metallic structure includes a metallic sheet, including a metallic-sheet first surface and a metallic-sheet second surface. The metallic structure includes a metallic doubler, extending from the metallic-sheet first surface, and a first junction between the metallic-sheet first surface and the metallic doubler. The metallic structure includes a metallic article, extending from the metallic-sheet second surface, and a second junction between the metallic-sheet second surface and the metallic article. The first junction has a first-junction boundary. The second junction has a second-junction boundary. When viewed at any point along the second-junction boundary in a direction, perpendicular to the metallic-sheet first surface, the second-junction boundary does not extend outside of the first-junction boundary. In a plane, intersecting the metallic doubler and perpendicular to the metallic-sheet first surface, the metallic doubler has at least a first doubler thickness and a second doubler thickness, which is less than the first doubler thickness.

20 Claims, 23 Drawing Sheets

(51) Int. Cl.
  *B33Y 80/00*   (2015.01)
  *B64C 9/24*    (2006.01)
  *F01D 25/24*       (2006.01)

(56) References Cited

U.S. PATENT DOCUMENTS

| | | |
|---|---|---|
| 6,419,146 B1 * | 7/2002 | Buldhaupt ............ B23K 26/206 29/6.1 |
| 9,623,977 B2 | 4/2017 | Runyan et al. |
| 10,294,815 B2 | 5/2019 | Runyan et al. |
| 10,941,455 B2 | 3/2021 | Dean |
| 11,161,590 B2 | 11/2021 | Vasel |
| 2004/0055248 A1 | 3/2004 | Grillos |
| 2006/0199031 A1 | 9/2006 | Kistner et al. |
| 2016/0122031 A1 | 5/2016 | Nasserrafi et al. |
| 2017/0342516 A1 | 11/2017 | Dean |
| 2022/0033055 A1 | 2/2022 | Behzadpour et al. |
| 2023/0054310 A1 * | 2/2023 | Aston ................... B29C 64/124 |

OTHER PUBLICATIONS

Gerald Austin, Welding VS Other Methods, Sep. 15, 2015 (Year: 2015).*

European Patent Office, Extended European Search Report, App. No. 23157357.7 (Jul. 28, 2023).

* cited by examiner

METALLIC STRUCTURES WITH ADDITIVELY MANUFACTURED METALLIC ARTICLES AND METHODS FOR FABRICATION

FIELD

The present disclosure relates generally to metallic structures and, more particularly, to metallic structures having a metallic sheet and at least one metallic article that is additively manufactured on a surface of the metallic sheet.

BACKGROUND

Metallic sandwich structures include a core sandwiched between a pair of face sheets. Metallic sandwich structures have a wide range of applications and may be desirable over solid metal panels due to their relative light weight and high strength. In many applications, metallic sandwich structures include various types of metallic articles, such as fittings or other functional components, which are coupled to a surface of one of the face sheets. The metallic articles are typically coupled to the face sheet of the metallic sandwich structure using mechanical fasteners. However, fasteners increase the weight, complexity, part count, and cycle time of the metallic sandwich structure. Other techniques for coupling the metallic articles may be limited due to the relative thinness of the face sheet. Accordingly, those skilled in the art continue with research and development efforts in the field of metallic sandwich structures.

SUMMARY

Disclosed are examples of a metallic structure and a method for fabricating the metallic structure. The following is a non-exhaustive list of examples, which may or may not be claimed, of the subject matter according to the present disclosure.

In an example, the disclosed metallic structure includes a metallic sheet, including a metallic-sheet first surface and a metallic-sheet second surface. The metallic-sheet first surface and the metallic-sheet second surface face in opposite directions. The metallic structure includes a metallic doubler, extending from a portion of the metallic-sheet first surface. The metallic structure includes a first junction between the portion of the metallic-sheet first surface and the metallic doubler. The metallic structure includes a metallic article, extending from a portion of the metallic-sheet second surface. The metallic structure includes a second junction between the portion of the metallic-sheet second surface and the metallic article. The first junction has a first-junction area and a first-junction boundary that circumscribes and defines the first-junction area. The second junction has a second-junction area and a second-junction boundary that circumscribes and defines the second-junction area. When viewed at any point along the second-junction boundary in a direction, perpendicular to the metallic-sheet first surface, the second-junction boundary does not extend outside of the first-junction boundary. In a plane P, intersecting the metallic doubler and perpendicular to the metallic-sheet first surface, the metallic doubler has at least a first doubler thickness and a second doubler thickness, which is less than the first doubler thickness.

In an example, the disclosed method includes steps of: (1) attaching a metallic doubler to a portion of a metallic-sheet first surface at a first junction; and (2) additively manufacturing a metallic article onto a portion of a metallic-sheet second surface at a second junction 116.

Other examples of the disclosed metallic structure and method for fabricating the metallic structure will become apparent from the following detailed description, the accompanying drawings, and the appended claims.

DETAILED DESCRIPTION

Referring to FIGS. 1-31, by way of examples, the present disclosure is directed to a metallic structure 100. Generally, the metallic structure 100 includes a metallic base structure and at least one metallic article connected or otherwise joined to the metallic base structure. In one or more examples, the metallic base structure is a metallic sandwich structure, and the metallic article is built-up or formed (e.g., via an additive manufacturing technique) on a portion of a surface of the metallic sandwich structure. As will be described in more detail herein, in one or more examples, the metallic structure 100 is fabricated to provide sufficient thickness and/or heat dissipation for forming the metallic article, while also minimizing the overall thickness and/or weight of the metallic structure 100.

Figure 4:
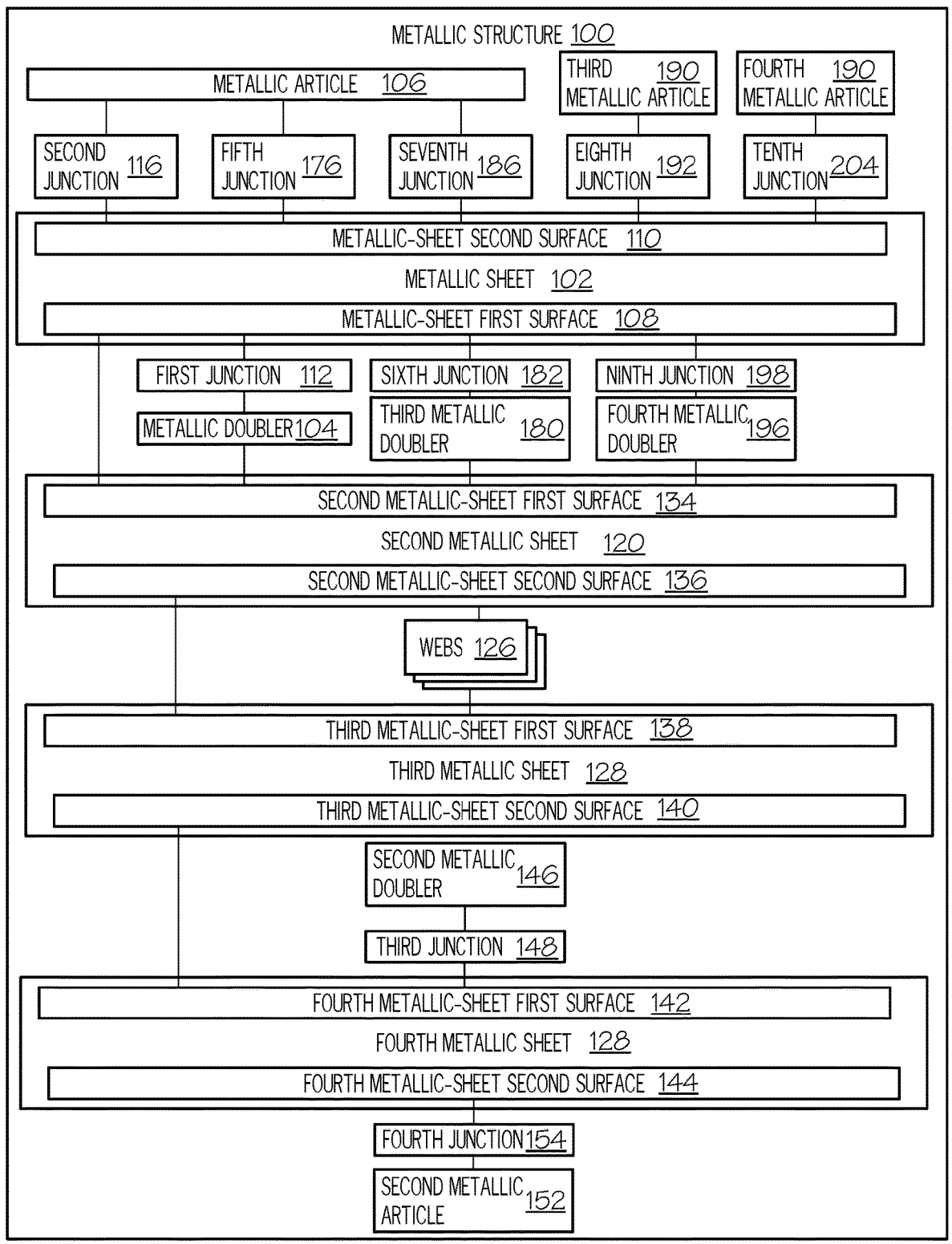
FIG. 4 is a schematic block diagram of an example of the metallic structure.
Figure 5:
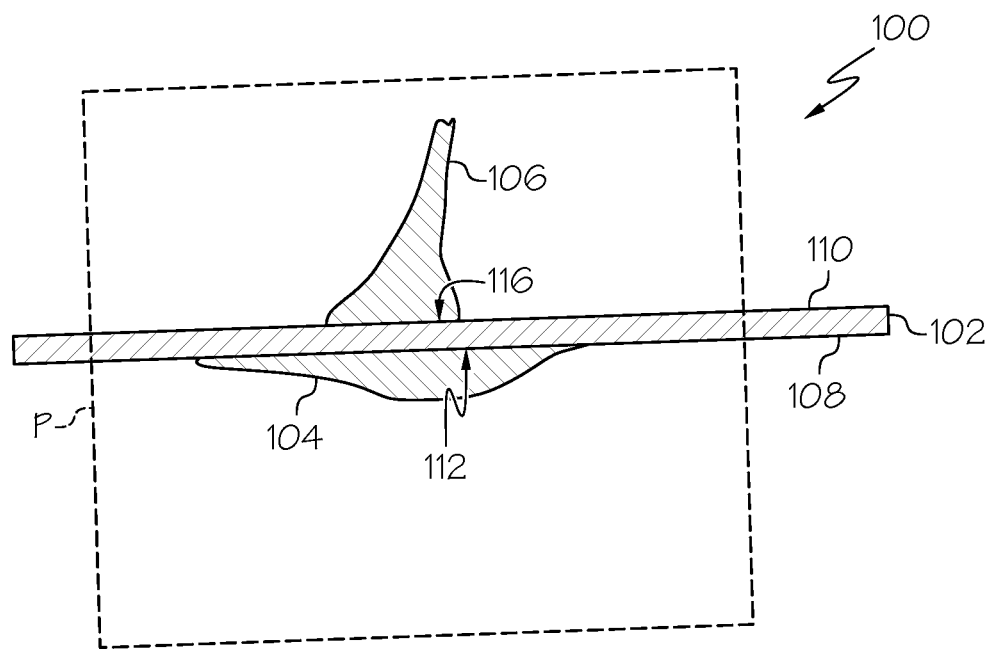
FIG. 5 is a schematic, elevation, sectional view of an example of a portion of the metallic structure, shown in FIG. 4.
Figure 6:
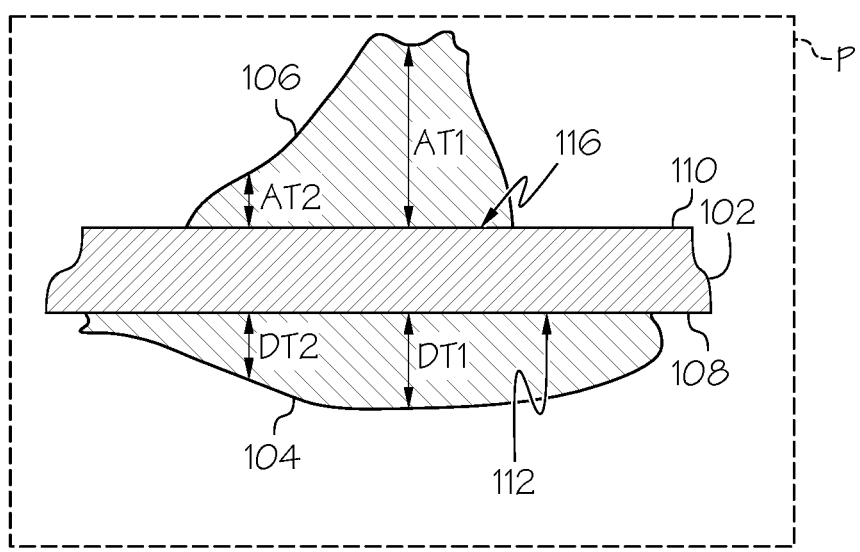
FIG. 6 is schematic, elevation, sectional view of an example of a portion of the metallic structure, shown in FIG. 4.
Figure 7:
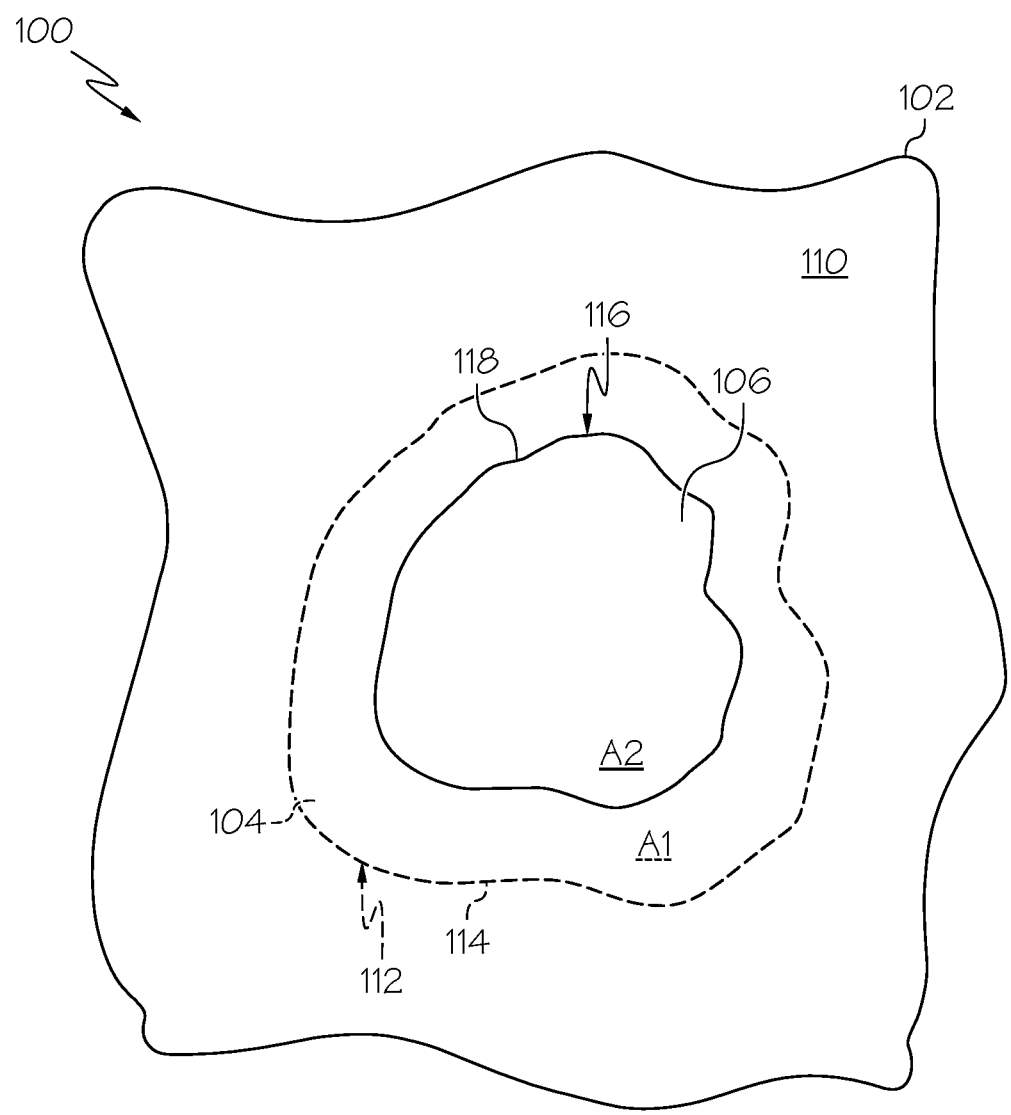
FIG. 7 is a schematic, plan view of an example of a portion of the metallic structure, shown in FIG. 4.

Referring generally to FIG. 4 and particularly to FIGS. 5-7, in one or more examples, the metallic structure 100 includes a metallic sheet 102, a metallic doubler 104, and a metallic article 106. The metallic sheet 102 includes a metallic-sheet first surface 108 and a metallic-sheet second surface 110. The metallic-sheet first surface 108 and the metallic-sheet second surface 110 face in opposite directions. The metallic doubler 104 extends from a portion of the metallic-sheet first surface 108. The metallic article 106 extends from a portion of the metallic-sheet second surface 110. The metallic structure 100 includes a first junction 112 between the portion of the metallic-sheet first surface 108 and the metallic doubler 104. The metallic structure 100 includes a second junction 116 between the portion of the metallic-sheet second surface 110 and the metallic article 106. The first junction 112 has a first-junction area A1 and a first-junction boundary 114 that circumscribes and defines the first-junction area A1 (e.g., as shown in FIG. 7). The second junction 116 has a second-junction area A2 and a second-junction boundary 118 that circumscribes and defines the second-junction area A2 (e.g., as shown in FIG. 7). When viewed at any point along the second-junction boundary 118 in a direction, perpendicular to the metallic-sheet first surface 108, the second-junction boundary 118 does not extend outside of the first-junction boundary 114 (e.g., as shown in FIG. 7). In a plane P, intersecting the metallic doubler 104 and perpendicular to the metallic-sheet first surface 108, the metallic doubler 104 has at least a first doubler thickness DT1 and a second doubler thickness DT2, which is less than the first doubler thickness DT1 (e.g., as shown in FIG. 6).

The metallic sheet 102 and the metallic doubler 104 form at least a portion of the metallic base structure (e.g., a metallic laminate) for the metallic structure 100. The metallic doubler 104 provides a structural backup for forming the metallic article 106 on or joining the metallic article 106 to the portion of the metallic-sheet second surface 110. This configuration provides additional strength to the metallic structure 100, particularly, in a region formed along the second junction 116. The metallic doubler 104 also facilitates improved and efficient transfer of heat away from the metallic sheet 102 when heat is used to form or join the metallic article 106, such as during additive manufacturing of the metallic article 106 on the metallic-sheet second surface 110 or welding of the metallic article 106 to the metallic-sheet second surface 110.

The second-junction boundary 118 not extending outside (e.g., beyond) the first-junction boundary 114 refers to an entirety of the second-junction area A2 being situated within or being surrounded by the first-junction area A1. The second-junction boundary 118 not extending outside the first-junction boundary 114 facilitates an entirety of the metallic article 106 being located over and being backed-up by the metallic doubler 104 when viewed at any point within the second-junction area A2 in a direction, perpendicular to the metallic-sheet first surface 108. This configuration may be particularly advantageous in examples where heat is used to form the metallic article 106 on or otherwise join the metallic article 106 to the metallic sheet 102.

In the plane P, intersecting the metallic doubler 104 and perpendicular to the metallic-sheet first surface 108, the second doubler thickness DT2 being less than first doubler thickness DT1 and/or other variations in the cross-sectional thickness of the metallic doubler 104 enables a geometry of the metallic doubler 104 (e.g., a size and/or a two-dimensional shape of the metallic doubler 104 in the direction, perpendicular to the metallic-sheet first surface 108, and a cross-sectional thickness of the metallic doubler 104 in the plane P, intersecting the metallic doubler 104 and perpendicular to the metallic-sheet first surface 108) to be tailored based on a size, configuration, type, or application of the metallic article 106. Tailoring the geometry of the metallic doubler 104 may beneficially facilitate an overall reduction in the thickness and/or the weight of the metallic structure 100.

In one or more examples, the portion of the metallic-sheet first surface 108 is coupled to the metallic doubler 104. Coupling the metallic sheet 102 and the metallic doubler 104 together facilitates an increase in the structural rigidity, robustness, and strength of metallic structure 100. The metallic sheet 102 and the metallic doubler 104 can be coupled together using any one of various techniques. In an example, the metallic sheet 102 and the metallic doubler 104 are diffusion bonded (e.g., coupled together by diffusion bonding or other solid-state welding techniques). In another example, the metallic sheet 102 and the metallic doubler 104 are welded. In another example, the metallic sheet 102 and the metallic doubler 104 are adhesively bonded (e.g., coupled together using an adhesive material).

In one or more examples, the metallic sheet 102 and the metallic doubler 104 are planar (e.g., having a generally flat profile) in the plane P, intersecting the metallic doubler 104 and perpendicular to the metallic-sheet first surface 108. In one or more examples, the metallic sheet 102 and the metallic doubler 104 are curved (e.g., having a contour, one or more nonplanar portions, or a complex shape) in the plane P, intersecting the metallic doubler 104 and perpendicular to the metallic-sheet first surface 108.

For the purpose of the present disclosure, items facing in opposite directions, for example, referring to a first surface and a second surface facing in opposite directions, refers to the items being approximately or substantially parallel but not necessarily exactly parallel to each other.

For the purpose of the present disclosure, the phrase in a direction, perpendicular to a surface, for example, the direction, perpendicular to the metallic-sheet first surface 108, refers to any direction that is perpendicular to the surface.

For illustration purposes, FIG. 7 shows the first-junction boundary 114 and second-junction boundary 118 as not having definite shapes. The first-junction boundary 114 can have any two-dimensional geometry, when viewed at any point along the first-junction boundary 114 in the direction, perpendicular to the metallic-sheet first surface 108, such as circular, square, rectangular, and the like. The first-junction boundary 114 can have a regular two-dimensional geometry or an irregular two-dimensional geometry. The first-junction boundary 114 can be symmetric or asymmetric. Similarly, the second-junction boundary 118 can have any two-dimensional geometry, when viewed at any point along the second-junction boundary 118 in the direction, perpendicular to the metallic-sheet first surface 108, such as circular, square, rectangular, and the like. The second-junction boundary 118 can have a regular two-dimensional geometry or an irregular two-dimensional geometry. The second-junction boundary 118 can be symmetric or asymmetric.

Referring generally to FIGS. 4 and 5 and particularly to FIG. 6, in one or more examples, in the plane P, intersecting the metallic doubler 104 and perpendicular to the metallic-sheet first surface 108, the metallic article 106 has at least a first article thickness AT1 and a second article thickness AT2, which is less than the first article thickness AT1.

In the plane P, intersecting the metallic doubler 104 and perpendicular to the metallic-sheet first surface 108, the second article thickness AT2 being less than first article thickness AT1 and/or other variations in the cross-sectional thickness of the metallic article 106 enables a geometry of the metallic article 106 (e.g., a size and/or a two-dimensional shape of the metallic article 106 in the direction, perpendicular to the metallic-sheet first surface 108, and a cross-sectional thickness and/or shape of the metallic article 106 in the plane P, intersecting the metallic doubler 104 and perpendicular to the metallic-sheet first surface 108) to be tailored based on application, function, or intended purpose of the metallic article 106. Tailoring the geometry of the metallic article 106 may beneficially facilitate an overall reduction in the size and/or the weight of the metallic structure 100.

Figure 8:
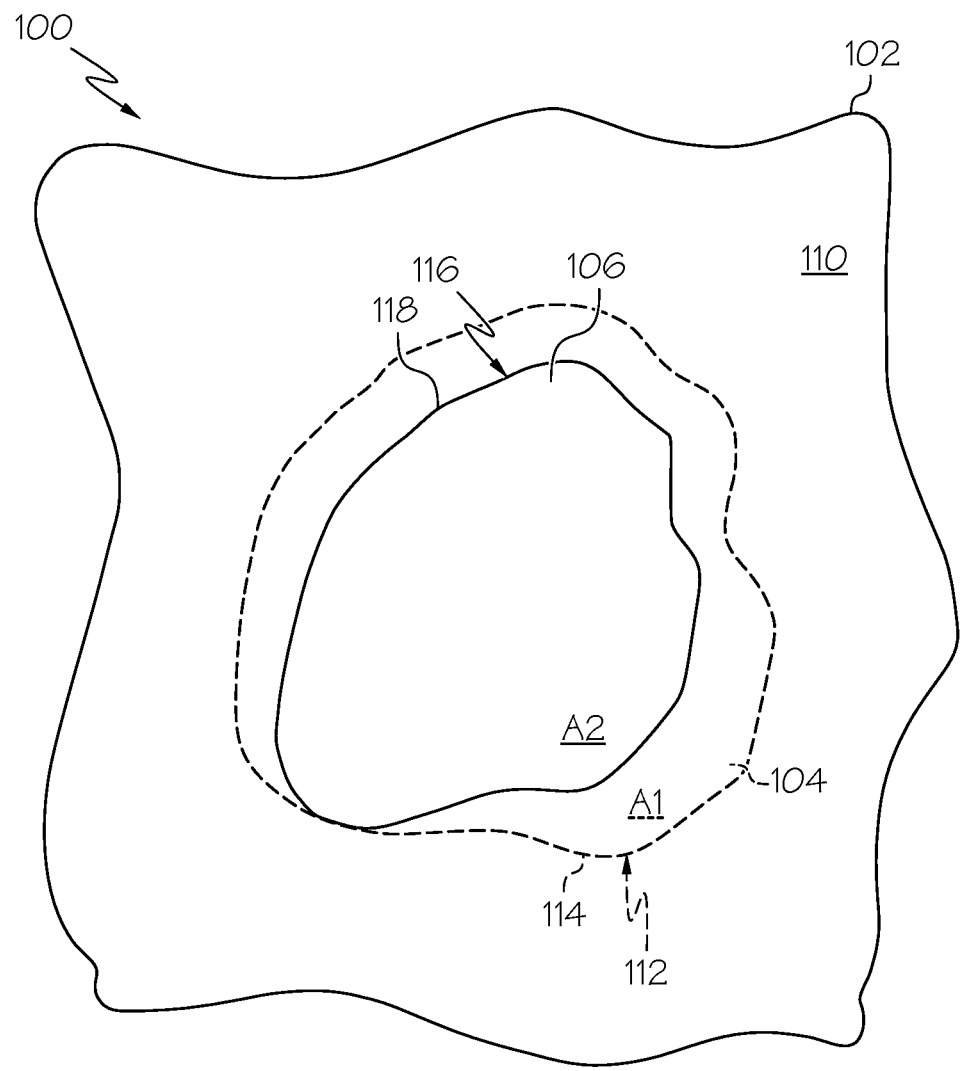
FIG. 8 is a schematic, plan view of an example of a portion of the metallic structure, shown in FIG. 4.

Referring generally to FIG. 4 and particularly to FIG. 8, in one or more examples, at least one point along the second-junction boundary 118 overlaps at least one point along the first-junction boundary 114 when at least the one point along the second-junction boundary 118 is viewed in the direction, perpendicular to the metallic-sheet first surface 108.

At least one point along the second-junction boundary 118 overlapping at least one point along the first-junction boundary 114 facilitates a reduction in the first-junction area A1, which provides a reduction in the size of the metallic doubler 104 and a further reduction in the overall weight of the metallic structure 100.

In one or more examples, at least one segment of the second-junction boundary 118 overlaps at least one segment of the first-junction boundary 114 when each point along at least the one segment of the second-junction boundary 118 is viewed in the direction, perpendicular to the metallic-sheet first surface 108.

At least one segment of the second-junction boundary 118 overlapping at least one segment of the first-junction boundary 114 facilitates a reduction in the first-junction area A1, which provides a reduction in the size of the metallic doubler 104 and a further reduction in the overall weight of the metallic structure 100.

Figure 9:
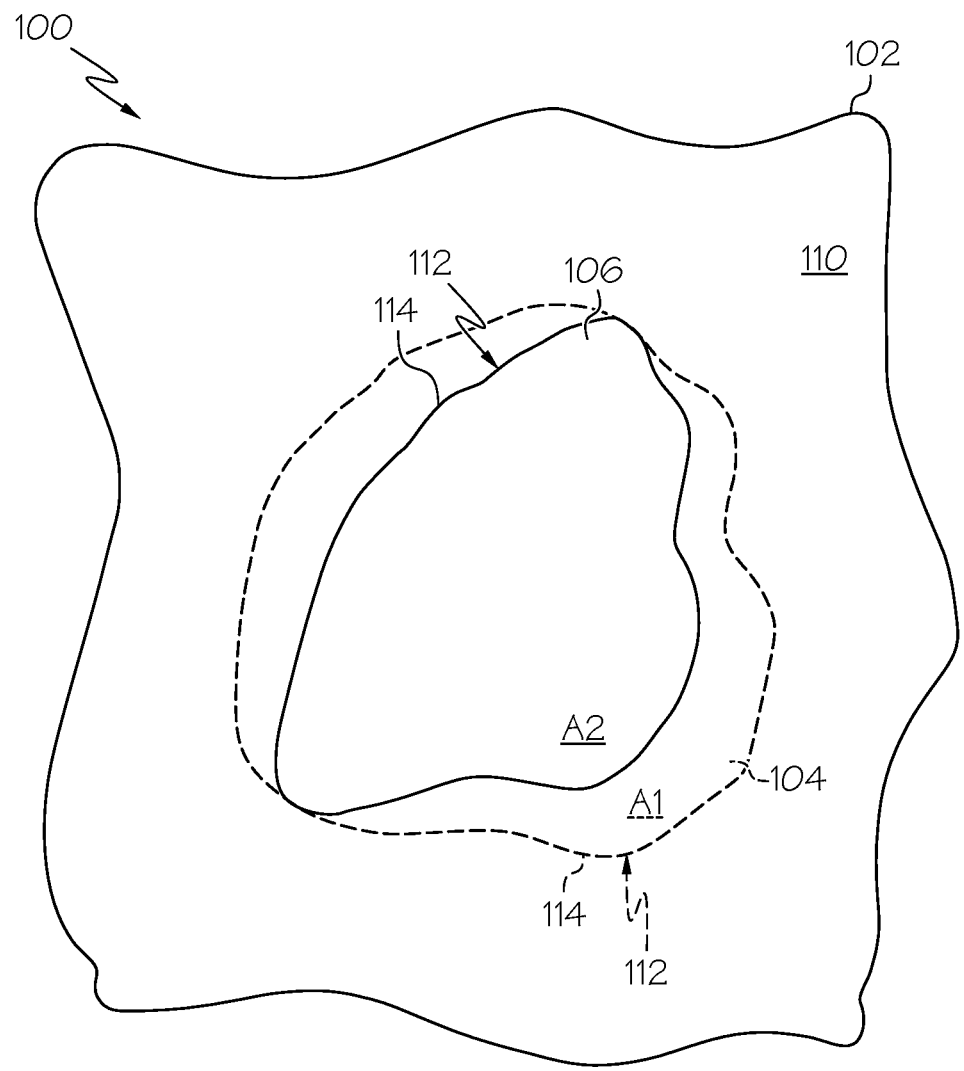
FIG. 9 is a schematic, plan view of an example of a portion of the metallic structure, shown in FIG. 4.

Referring generally to FIG. 4 and particularly to FIG. 9, in one or more examples, at least two points along the second-junction boundary 118 overlap at least two corresponding points along the first-junction boundary 114 when each of at least the two points along the second-junction boundary 118 is viewed in the direction, perpendicular to the metallic-sheet first surface 108. At least the two points along the second-junction boundary 118 are spaced apart from each other.

At least two points along the second-junction boundary 118 overlapping at least two corresponding points along the first-junction boundary 114 facilitates a further reduction in the first-junction area A1, which provides a further reduction in the size of the metallic doubler 104 and a further reduction in the overall weight of the metallic structure 100.

In one or more examples, at least two segments of the second-junction boundary 118 overlap at least two corresponding segments of the first-junction boundary 114 when each point along any one of at least the two segments of the second-junction boundary 118 is viewed in the direction, perpendicular to the metallic-sheet first surface 108. At least the two segments of the second-junction boundary 118 are spaced apart from each other.

At least two segments of the second-junction boundary 118 overlapping at least two corresponding segments of the first-junction boundary 114 facilitates a further reduction in the first-junction area A1, which provides a further reduction in the size of the metallic doubler 104 and a further reduction in the overall weight of the metallic structure 100.

Figure 1:
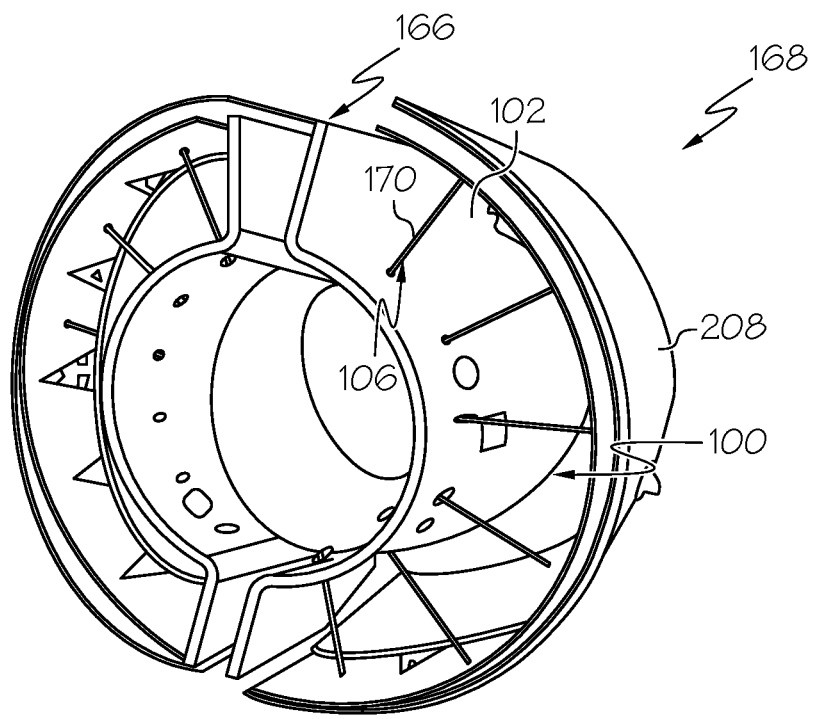
FIG. 1 is a schematic illustration of an example of a fan duct that includes an inner wall including a metallic structure.
Figure 10:
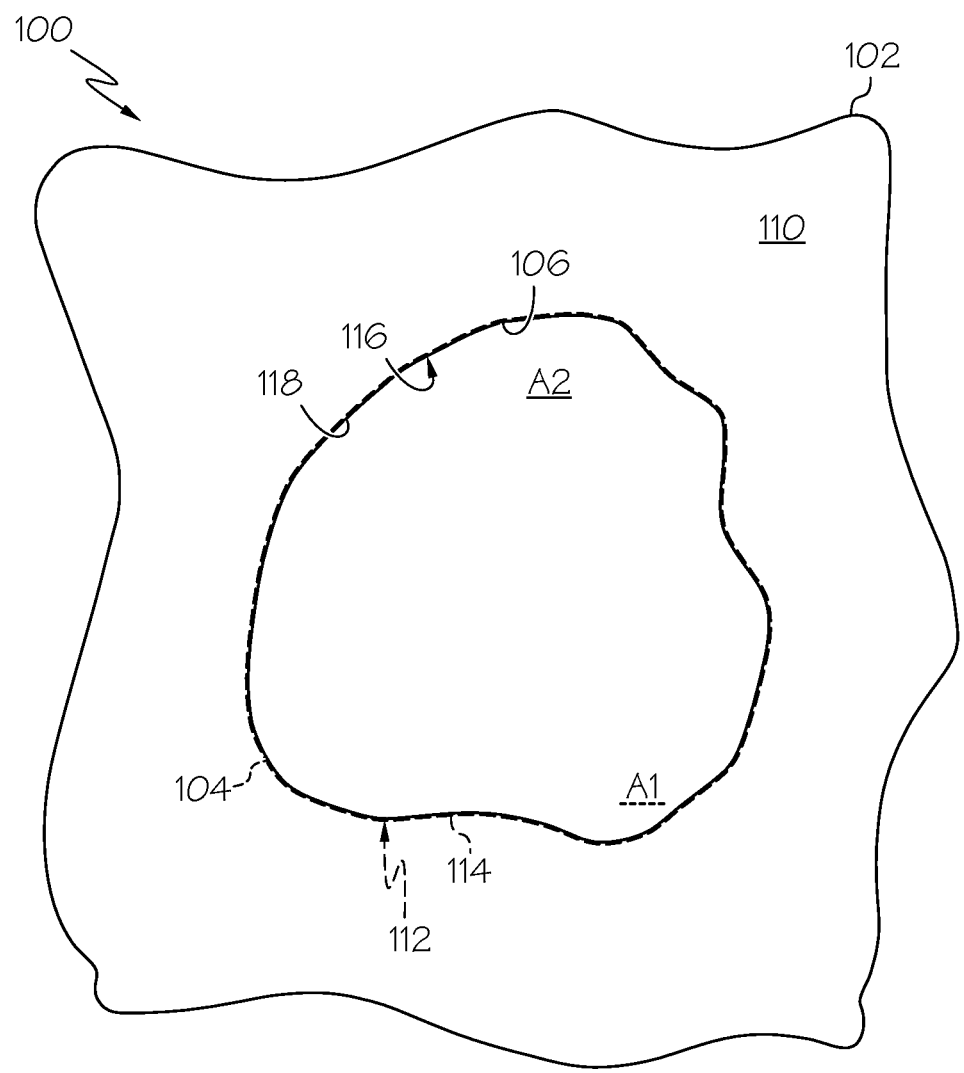
FIG. 10 is a schematic, plan view of an example of a portion of the metallic structure, shown in FIG. 4.

Referring generally to FIG. 1 and particularly to FIG. 10, in one or more examples, the second-junction boundary 118 and the first-junction boundary 114 completely overlap each other when each point along the second-junction boundary 118 is viewed in the direction, perpendicular to the metallic-sheet first surface 108.

The second-junction boundary 118 and the first-junction boundary 114 completely overlapping each other facilitates a minimization of the first-junction area A1, which provides a further reduction in the size of the metallic doubler 104 and a further reduction in the overall weight of the metallic structure 100.

Referring to FIGS. 4 and 7-9, in one or more examples, the first-junction area A1 is at least one percent larger than the second-junction area A2. In one or more examples, the first-junction area A1 is at least two percent larger than the second-junction area A2. In one or more examples, the first-junction area A1 is at least five percent larger than the second-junction area A2. In one or more examples, the first-junction area A1 is at least ten percent larger than the second-junction area A2.

In the above examples, the first-junction area A1 being larger than the second-junction area A2 to some extent provides a sufficient area of the first-junction boundary 114 of the metallic doubler 104 that extends beyond and that underlies the second-junction boundary 118 of the metallic article 106 for forming the metallic article 106 on or joining the metallic article 106 to the metallic sheet 102, while minimizing the overall size of the metallic doubler 104.

Figure 11:
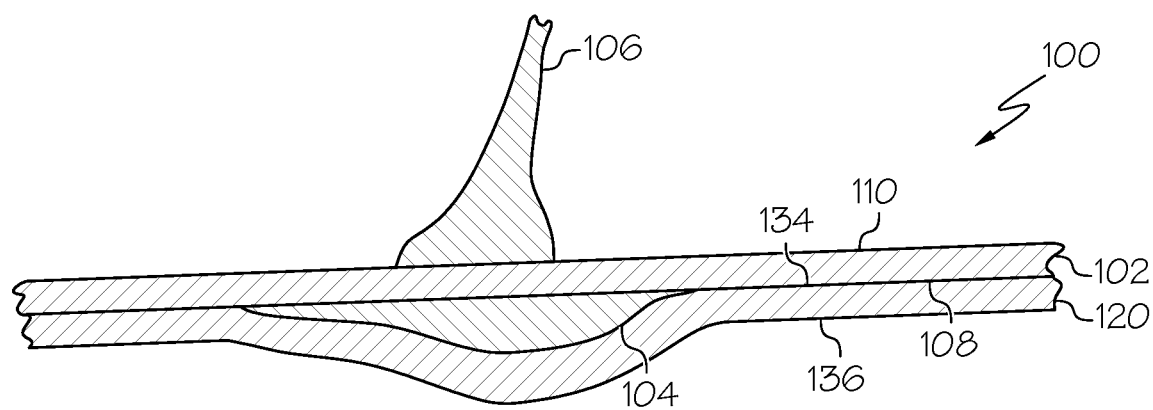
FIG. 11 is a schematic, elevation, sectional view of an example of a portion of the metallic structure, shown in FIG. 4.

Referring generally to FIG. 4 and particularly to FIG. 11, in one or more examples, the metallic structure 100 includes a second metallic sheet 120. The second metallic sheet 120 includes a second-metallic-sheet first surface 134 and a second-metallic-sheet second surface 136. The second-metallic-sheet first surface 134 and the second-metallic-sheet second surface 136 face in opposite directions. A portion of the second-metallic-sheet first surface 134 is in contact with a second portion of the metallic-sheet first surface 108. The metallic doubler 104 is sandwiched between the metallic-sheet first surface 108 and the second-metallic-sheet first surface 134.

The metallic sheet 102, the metallic doubler 104, and the second metallic sheet 120 form at least a portion of the metallic base structure (e.g., a metallic laminate) for the metallic structure 100. The metallic doubler 104 provides a structural backup for forming the metallic article 106 on or joining the metallic article 106 to the portion of the metallic-sheet second surface 110. The second metallic sheet 120 provides increased structural rigidity, strength, and robustness to the metallic structure 100. This configuration provides additional strength to the metallic structure 100, particularly, in regions formed away from the second junction 116.

Referring generally to FIG. 4 and particularly to FIG. 11, in one or more examples, the portion of the second-metallic-sheet first surface 134 is coupled to the second portion of the metallic-sheet first surface 108. A second portion of the second-metallic-sheet first surface 134 is coupled to the metallic doubler 104. The portion of the metallic-sheet first surface 108 is coupled to the metallic doubler 104.

Coupling the metallic sheet 102, the metallic doubler 104, and the second metallic sheet 120 together facilitates an increase in the structural rigidity, robustness, and strength of metallic structure 100. The metallic sheet 102, the metallic doubler 104, and the second metallic sheet 120 can be coupled together using any one of various techniques. In an example, the metallic sheet 102, the metallic doubler 104, and the second metallic sheet 120 are diffusion bonded. In another example, the metallic sheet 102, the metallic doubler 104, and the second metallic sheet 120 are welded. In another example, the metallic sheet 102, the metallic doubler 104, and the second metallic sheet 120 are adhesively bonded.

Figure 12:
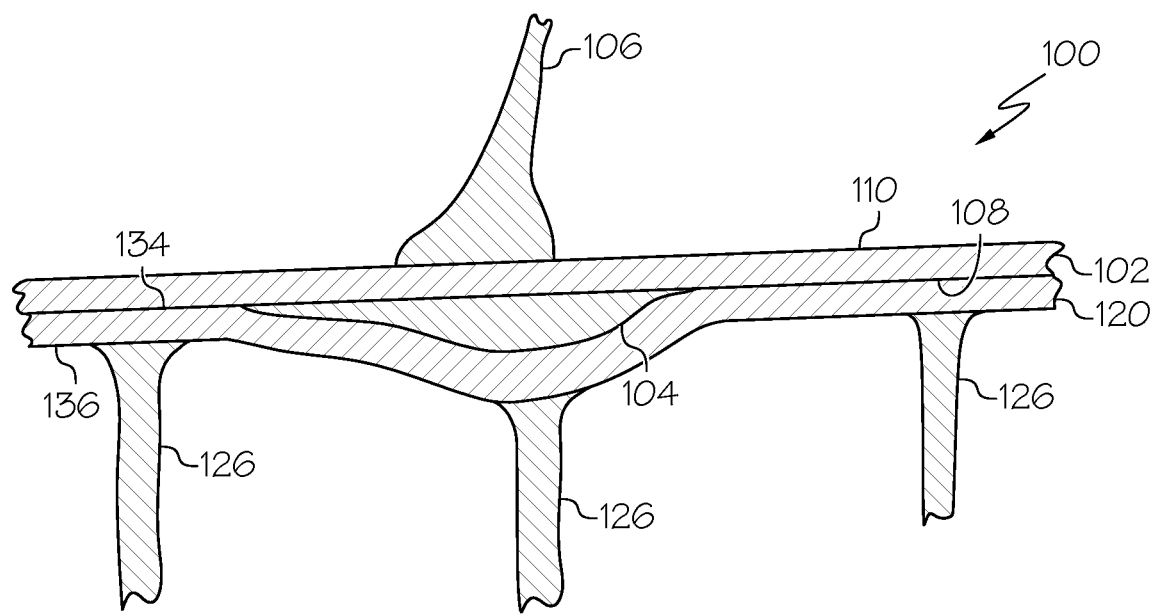
FIG. 12 is a schematic, elevation, sectional view of an example of a portion of the metallic structure, shown in FIG. 4.
Figure 13:
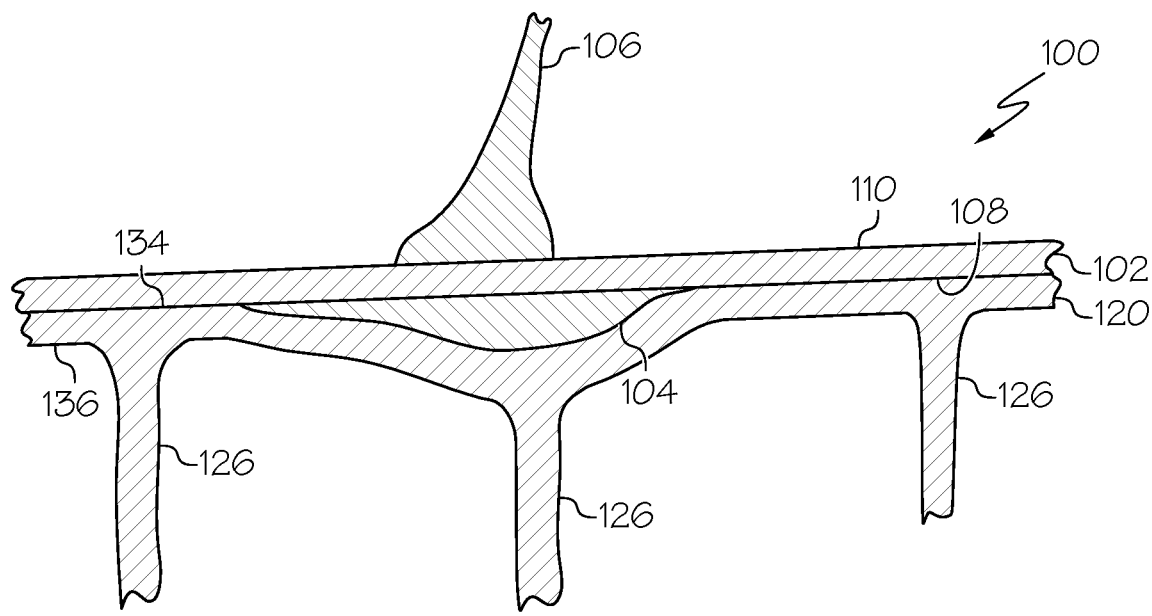
FIG. 13 is a schematic, elevation, sectional view of an example of a portion of the metallic structure, shown in FIG. 4.

Referring generally to FIG. 4 and particularly to FIGS. 12 and 13, in one or more examples, the metallic structure 100 includes webs 126 that extend from the second metallic sheet 120.

The metallic sheet 102, the metallic doubler 104, the second metallic sheet 120, and the webs 126 form at least a portion of the metallic base structure (e.g., a stiffened metallic laminate or panel) for the metallic structure 100. The webs 126 facilitate an increase in the structural rigidity, robustness, and strength of metallic structure 100 and an increase the ability of the metallic structure 100 to react to bending loads without an excessive increase to the overall weight of the metallic structure 100.

In one or more examples, the webs 126 are coupled to and extend from the second-metallic-sheet first surface 134 (e.g., as shown in FIG. 12). As an example, the webs 126 are coupled to portions of the second-metallic-sheet first surface 134 using any suitable technique. In one or more examples, the webs 126 are formed from or by deformed or stretched portions of the second metallic sheet 120. As an example, the webs 126 are formed using superplastic forming techniques. In one or more examples, the metallic sheet 102, the metallic doubler 104, and the second metallic sheet 120 are bonded together and the webs 126 are formed during the same process, for example, using a superplastic forming and diffusion bonding (SPF/DB) technique.

Referring generally to FIG. 4 and particularly to FIGS. 12 and 12, in one or more examples, at least a portion of a cross-section of at least one of the webs 126 overlaps at least a portion of the second junction 116 when each point of at least the portion of the cross-section of at least the one of the webs 126 is viewed in the direction, perpendicular to the metallic-sheet first surface 108.

Situating the webs 126 along the second metallic sheet 120 and relative to the metallic doubler 104 such that at least the portion of the cross-section of at least the one of the webs 126 overlaps at least the portion of the second junction 116 when each point of at least the portion of the cross-section of at least the one of the webs 126 is viewed in the direction, perpendicular to the metallic-sheet first surface 108, facilitates improved and efficient transfer of heat away from the metallic doubler 104 when heat is used to form or join the metallic article 106, such as during additive manufacturing of the metallic article 106 on the metallic-sheet second surface 110 or welding of the metallic article 106 to the metallic-sheet second surface 110.

Figure 14:
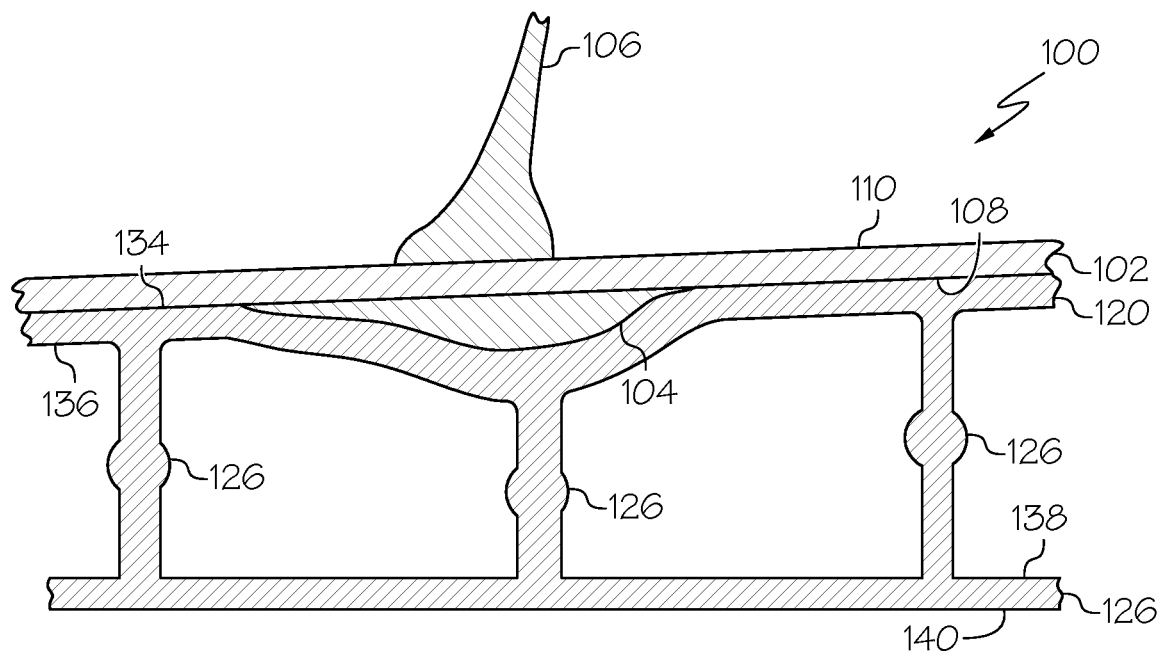
FIG. 14 is a schematic, elevation, sectional view of an example of a portion of the metallic structure, shown in FIG. 4.

Referring generally to FIG. 4 and particularly to FIG. 14, in one or more examples, the metallic structure 100 includes a third metallic sheet 128. The third metallic sheet 128 is spaced apart from the second metallic sheet 120. The third metallic sheet 128 includes a third-metallic-sheet first surface 138 and a third-metallic-sheet second surface 140. The third-metallic-sheet first surface 138 and the third-metallic-sheet second surface 140 face in opposite directions. The second-metallic-sheet first surface 134 and the third-metallic-sheet first surface 138 face each other. The webs 126 extend between the second metallic sheet 120 and the third metallic sheet 128.

The metallic sheet 102, the metallic doubler 104, the second metallic sheet 120, the webs 126, and the third metallic sheet 128 form at least a portion of the metallic base structure (e.g., an expanded metallic sandwich panel) for the metallic structure 100. Inclusion of the third metallic sheet 128 facilitates the metallic structure 100 taking the form of an expanded sandwich structure.

In one or more examples, the webs 126 are coupled to and extend between the second-metallic-sheet first surface 134 and the third-metallic-sheet first surface 138. As an example, the webs 126 are coupled to portions of the second-metallic-sheet first surface 134 and to portions of the third-metallic-sheet first surface 138 using any suitable technique. In one or more examples, the webs 126 are formed from or by deformed or stretched portions of the second metallic sheet 120 and the third metallic sheet 128. As an example, the webs 126 are formed using superplastic forming techniques. In one or more examples, the metallic sheet 102, the metallic doubler 104, and the second metallic sheet 120 are bonded together and the webs 126 are formed during the same process, for example, using a superplastic forming and diffusion bonding (SPF/DB) technique. For example, a plurality of rows of intermittent welds are formed to connect portions of the second-metallic-sheet second surface 136 and portions of the third-metallic-sheet first surface 138 together. Each one of the webs 126 is defined between the second metallic sheet 120 and the third metallic sheet 128 along a corresponding one of the plurality of rows of intermittent welds. The webs 126 are formed during expansion of the second metallic sheet 120 and the third metallic sheet 128 away from each other. Each one of the webs 126 includes integral, laterally deformed portions of the second metallic sheet 120 and the third metallic sheet 128 formed on either side of the corresponding one of the plurality of rows of intermittent welds.

Figure 15:
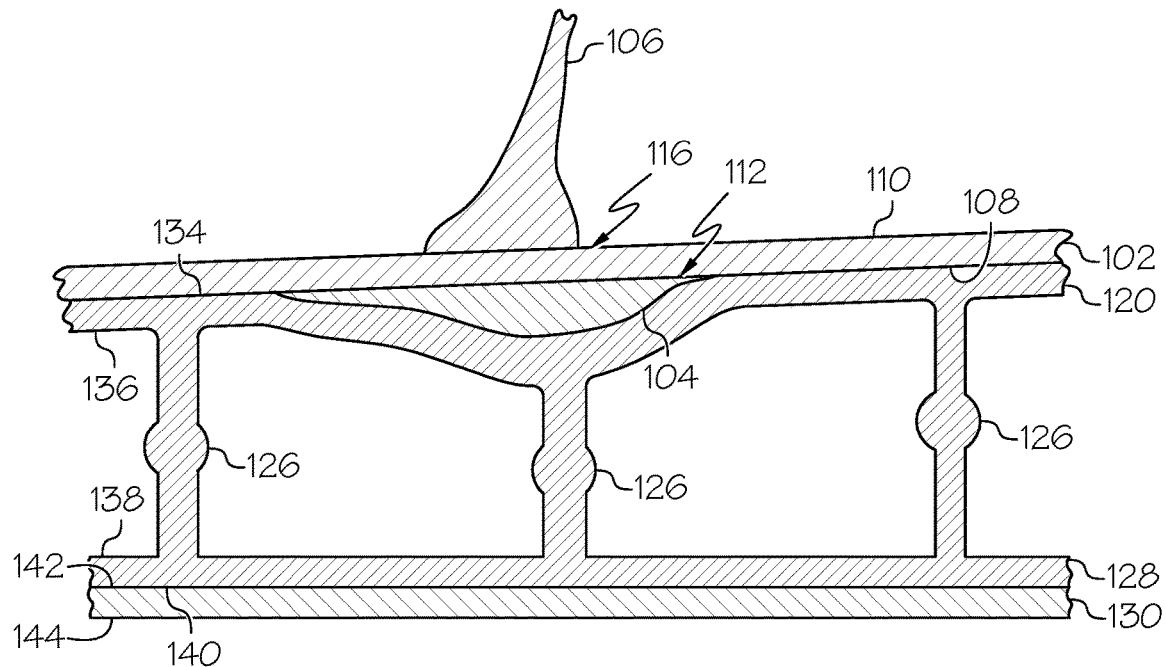
FIG. 15 is a schematic, elevation, sectional view of an example of a portion of the metallic structure, shown in FIG. 4.

Referring generally to FIG. 4 and particularly to FIG. 15, in one or more examples, the metallic structure 100 includes a fourth metallic sheet 130. The fourth metallic sheet 130 includes a fourth-metallic-sheet first surface 142 and a fourth-metallic-sheet second surface 144. The fourth-metallic-sheet first surface 142 and the fourth-metallic-sheet second surface 144 face in opposite directions. At least a portion of the fourth-metallic-sheet first surface 142 is in contact with at least a portion of the third-metallic-sheet second surface 140.

The metallic sheet 102, the metallic doubler 104, the second metallic sheet 120, the webs 126, the third metallic sheet 128, and the fourth metallic sheet 130 form at least a portion of the metallic base structure (e.g., an expanded metallic sandwich panel) for the metallic structure 100. The fourth metallic sheet 130 Increase structural rigidity and strength of metallic structure 100. Inclusion of the fourth metallic sheet 130 also facilitates the metallic structure 100 taking the form of an expanded sandwich structure and formation of the webs 126 using superplastic forming techniques.

In one or more examples, at least the portion of the fourth-metallic-sheet first surface 142 is coupled to at least the portion of the third-metallic-sheet second surface 140.

Coupling the fourth metallic sheet 130 and the third metallic sheet 128 together facilitates an increase in the structural rigidity, robustness, and strength of metallic structure 100. The fourth metallic sheet 130 and the third metallic sheet 128 can be coupled together using any one of various techniques. In an example, the fourth metallic sheet 130 and the third metallic sheet 128 are diffusion bonded. In another example, the fourth metallic sheet 130 and the third metallic sheet 128 are welded. In another example, the fourth metallic sheet 130 and the third metallic sheet 128 are adhesively bonded. In one or more examples, the metallic sheet 102, the metallic doubler 104, the second metallic sheet 120 are bonded together, the third metallic sheet 128 and the fourth metallic sheet 130 are bonded together, and the webs 126 are formed during the same process, for example, using a superplastic forming and diffusion bonding (SPF/DB) technique.

Figure 16:
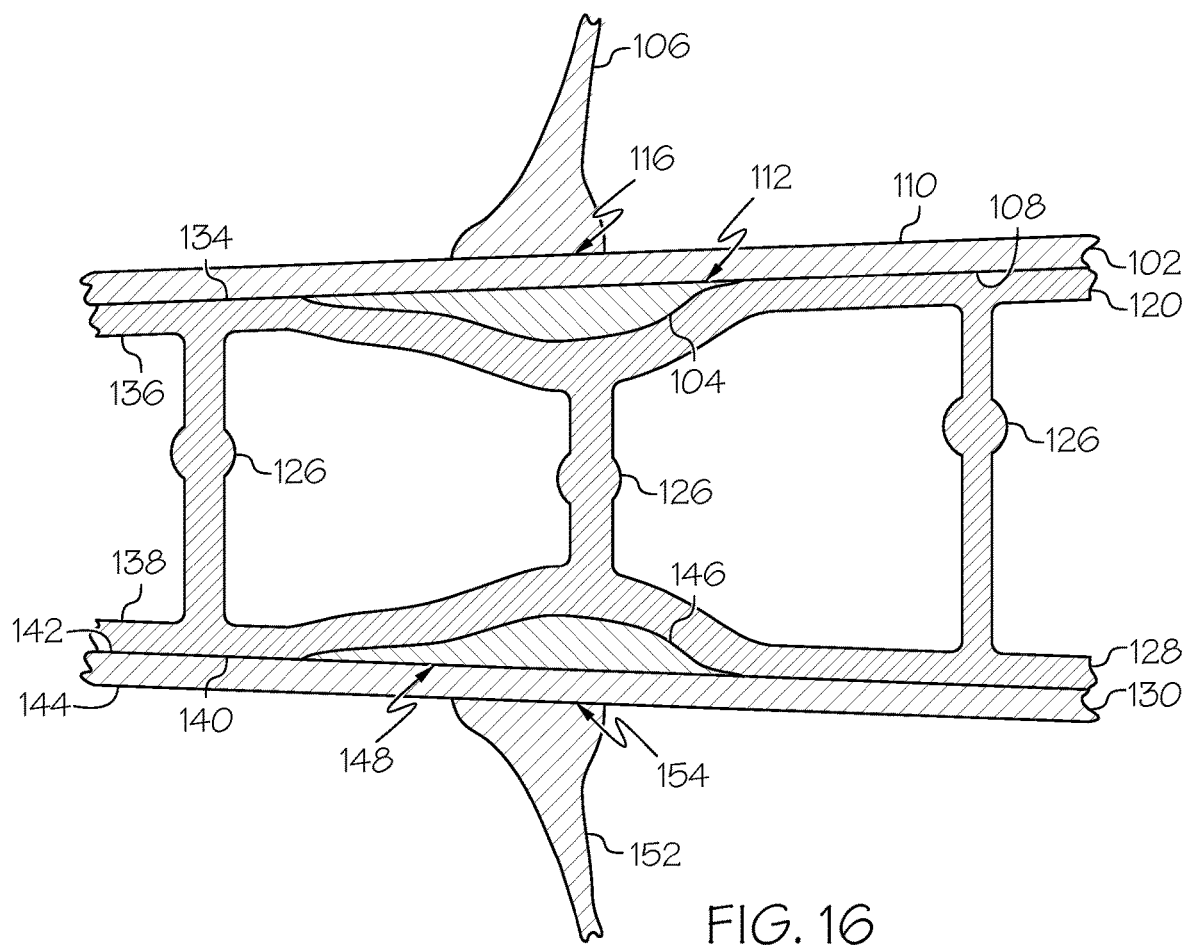
FIG. 16 is a schematic, perspective view of an example of a portion of the metallic structure, shown in FIG. 4.
Figure 17:
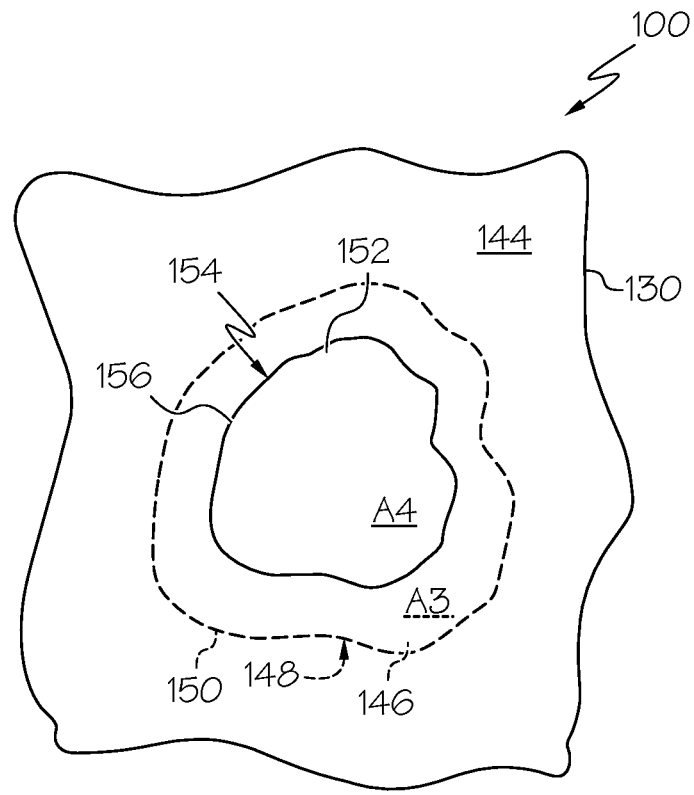
FIG. 17 is a schematic, plan view of an example of a portion of the metallic structure, shown in FIG. 4.
Figure 18:
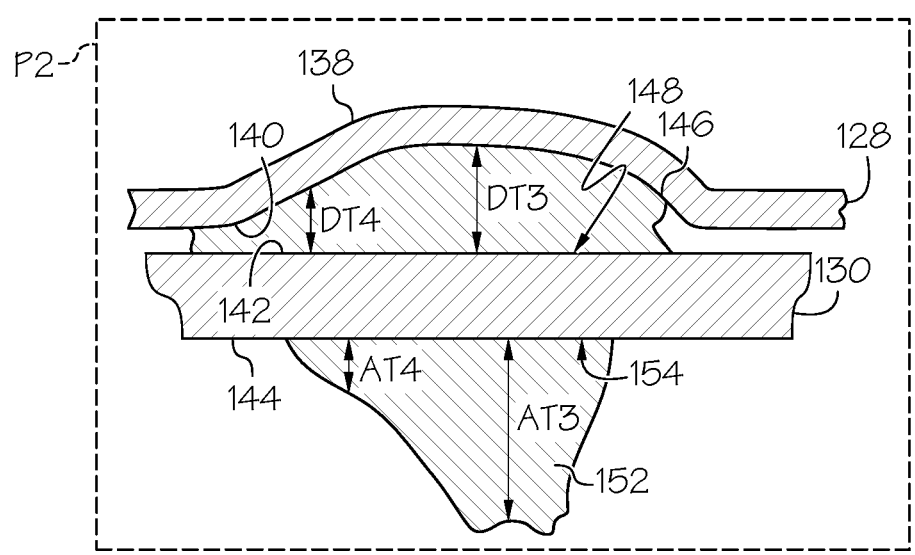
FIG. 18 is schematic, elevation, sectional view of an example of a portion of the metallic structure, shown in FIG. 4.

Referring generally to FIG. 4 and particularly to FIGS. 16-18, in one or more examples, the metallic structure 100 includes a second metallic doubler 146 and a second metallic article 152. The second metallic doubler 146 extends between a second portion of the third-metallic-sheet second surface 140 and a second portion of the fourth-metallic-sheet first surface 142. The second metallic article 152 extends from a portion of the fourth-metallic-sheet second surface 144. The metallic structure 100 includes a third junction 148 between the second portion of the fourth-metallic-sheet first surface 142 and the second metallic doubler 146. The metallic structure 100 includes a fourth junction 154 between the portion of the fourth-metallic-sheet second surface 144 and the second metallic article 152. The third junction 148 has a third-junction boundary 150 that circumscribes and defines a third-junction area A3 (e.g., as shown in FIG. 17). The fourth junction 154 has a fourth-junction boundary 156 that circumscribes and defines a fourth-junction area A4 (e.g., as shown in FIG. 17). When viewed at any point along the fourth-junction boundary 156 in a direction, perpendicular to the fourth-metallic-sheet first surface 142, the fourth-junction boundary 156 does not extend outside the third-junction boundary 150 (e.g., as shown in FIG. 17). In a second plane P2, intersecting the second metallic doubler 146 and perpendicular to the fourth-metallic-sheet first surface 142, the second metallic doubler 146 has at least a third doubler thickness DT3 and a fourth doubler thickness DT4, which is less than the third doubler thickness DT3 (e.g., as shown in FIG. 18).

The third metallic sheet 128, the second metallic doubler 146, and the fourth metallic sheet 130 form at least a portion of the metallic base structure (e.g., a metallic laminate) for the metallic structure 100. The second metallic doubler 146 provides a structural backup for forming the second metallic article 152 on or joining the second metallic article 152 to the portion of the fourth-metallic-sheet second surface 144. This configuration provides additional strength to the metallic structure 100, particularly, in a region formed along the fourth junction 154. The second metallic doubler 146 also facilitates improved and efficient transfer of heat away from the fourth metallic sheet 130 when heat is used to form or join the second metallic article 152, such as during additive manufacturing of the second metallic article 152 on the fourth-metallic-sheet second surface 144 or welding of the second metallic article 152 to the fourth-metallic-sheet second surface 144.

The fourth-junction boundary 156 not extending outside (e.g., beyond) the third-junction boundary 150 refers to an entirety of the fourth-junction area A4 being situated within or being surrounded by the third-junction area A3. The fourth-junction boundary 156 not extending outside the third-junction boundary 150 facilitates an entirety of the second metallic article 152 being located over and being backed-up by the second metallic doubler 146 when viewed at any point within the fourth-junction area A4 in a direction, perpendicular to the fourth-metallic-sheet first surface 142. This configuration may be particularly advantageous in examples where heat is used to form the second metallic article 152 on or otherwise join the second metallic article 152 to the fourth metallic sheet 130.

In the second plane P2, intersecting the second metallic doubler 146 and perpendicular to the fourth-metallic-sheet first surface 142, the fourth doubler thickness DT4 being less than third doubler thickness DT3 and/or other variations in the cross-sectional thickness of the second metallic doubler 146 enables a geometry of the second metallic doubler 146 (e.g., a size and/or a two-dimensional shape of the second metallic doubler 146 in the direction, perpendicular to the fourth-metallic-sheet first surface 142, and a cross-sectional thickness of the second metallic doubler 146 in the second plane P2, intersecting the second metallic doubler 146 and perpendicular to the fourth-metallic-sheet first surface 142) to be tailored based on a size, configuration, type, or application of the second metallic article 152. Tailoring the geometry of the second metallic doubler 146 may beneficially facilitate an overall reduction in the thickness and/or the weight of the metallic structure 100.

In one or more examples, the second portion of the third-metallic-sheet second surface 140 is coupled to the second metallic doubler 146 and second portion of the fourth-metallic-sheet first surface 142 is coupled to the second metallic doubler 146. Coupling the third metallic sheet 128, the second metallic doubler 146, and the fourth metallic sheet 130 together facilitates an increase in the structural rigidity, robustness, and strength of metallic structure 100. The third metallic sheet 128, the second metallic doubler 146, and the fourth metallic sheet 130 can be coupled together using any one of various techniques. In an example, the third metallic sheet 128, the second metallic doubler 146, and the fourth metallic sheet 130 are diffusion bonded. In another example, the third metallic sheet 128, the second metallic doubler 146, and the fourth metallic sheet 130 are welded. In another example, the third metallic sheet 128, the second metallic doubler 146, and the fourth metallic sheet 130 are adhesively bonded. In one or more examples, the metallic sheet 102, the metallic doubler 104, the second metallic sheet 120 are bonded together, the third metallic sheet 128, the second metallic doubler 146, and the fourth metallic sheet 130 are bonded together, and the webs 126 are formed during the same process, for example, using a superplastic forming and diffusion bonding (SPF/DB) technique.

In one or more examples, the third metallic sheet 128, the second metallic doubler 146, and the fourth metallic sheet 130 are planar (e.g., having a generally flat profile) in the second plane P2, intersecting the second metallic doubler 146 and perpendicular to the fourth-metallic-sheet first surface 142. In one or more examples, the third metallic sheet 128, the second metallic doubler 146, and the fourth metallic sheet 130 are curved (e.g., having a contour, one or more nonplanar portions, or a complex shape) in the second plane P2, intersecting the second metallic doubler 146 and perpendicular to the fourth-metallic-sheet first surface 142.

For illustration purposes, FIG. 17 shows the third-junction boundary 150 and fourth-junction boundary 156 as not having definite shapes. The third-junction boundary 150 can have any two-dimensional geometry, when viewed at any point along the third-junction boundary 150 in the direction, perpendicular to the fourth-metallic-sheet first surface 142, such as circular, square, rectangular, and the like. The third-junction boundary 150 can have a regular two-dimensional geometry or an irregular two-dimensional geometry. The third-junction boundary 150 can be symmetric or asymmetric. Similarly, the fourth-junction boundary 156 can have any two-dimensional geometry, when viewed at any point along the fourth-junction boundary 156 in the direction, perpendicular to the fourth-metallic-sheet first surface 142, such as circular, square, rectangular, and the like. The fourth-junction boundary 156 can have a regular two-dimensional geometry or an irregular two-dimensional geometry. The fourth-junction boundary 156 can be symmetric or asymmetric.

Referring generally to FIGS. 4 and 16 and particular to FIG. 18, in one or more examples, in the second plane P2, intersecting the second metallic doubler 146 and perpendicular to the fourth-metallic-sheet first surface 142, the second metallic article 152 has at least a third article thickness AT3 and a fourth article thickness AT4, which is less than the third article thickness AT3.

In the second plane P2, intersecting the second metallic doubler 146 and perpendicular to the fourth-metallic-sheet first surface 142, the fourth article thickness AT4 being less than third article thickness AT3 and/or other variations in the cross-sectional thickness of the second metallic article 152 enables a geometry of the second metallic article 152 (e.g., a size and/or a two-dimensional shape of the second metallic article 152 in the direction, perpendicular to the fourth-metallic-sheet first surface 142, and a cross-sectional thickness and/or shape of the second metallic article 152 in the second plane P2, intersecting the second metallic doubler 146 and perpendicular to the fourth-metallic-sheet first surface 142) to be tailored based on application, function, or intended purpose of the second metallic article 152. Tailoring the geometry of the second metallic article 152 may beneficially facilitate an overall reduction in the size and/or the weight of the metallic structure 100.

In one or more examples, at least one point along the fourth-junction boundary 156 overlaps at least one point along the third-junction boundary 150 when at least the one point along the fourth-junction boundary 156 is viewed in the direction, perpendicular to the fourth-metallic-sheet first surface 142. At least one point along the fourth-junction boundary 156 overlapping at least one point along the third-junction boundary 150 facilitates a reduction in the third-junction area A3, which provides a reduction in the size of the second metallic doubler 146 and a further reduction in the overall weight of the metallic structure 100.

In one or more examples, at least one segment of the fourth-junction boundary 156 overlaps at least one segment of the third-junction boundary 150 when each point along at least the one segment of the fourth-junction boundary 156 is viewed in the direction, perpendicular to the fourth-metallic-sheet first surface 142. At least one segment of the fourth-junction boundary 156 overlapping at least one segment of the third-junction boundary 150 facilitates a reduction in the third-junction area A3, which provides a reduction in the size of the second metallic doubler 146 and a further reduction in the overall weight of the metallic structure 100.

In one or more examples, at least two points along the fourth-junction boundary 156 overlap at least two corresponding points along the third-junction boundary 150 when each of at least the two points along the fourth-junction boundary 156 is viewed in the direction, perpendicular to the fourth-metallic-sheet first surface 142. At least the two points along the fourth-junction boundary 156 are spaced apart from each other. At least two points along the fourth-junction boundary 156 overlapping at least two corresponding points along the third-junction boundary 150 facilitates a further reduction in the third-junction area A3, which provides a further reduction in the size of the second metallic doubler 146 and a further reduction in the overall weight of the metallic structure 100.

In one or more examples, at least two segments of the fourth-junction boundary 156 overlap at least two corresponding segments of the third-junction boundary 150 when each point along any one of at least the two segments of the fourth-junction boundary 156 is viewed in the direction, perpendicular to the fourth-metallic-sheet first surface 142. At least the two segments of the fourth-junction boundary 156 are spaced apart from each other. At least two segments of the fourth-junction boundary 156 overlapping at least two corresponding segments of the third-junction boundary 150 facilitates a further reduction in the third-junction area A3, which provides a further reduction in the size of the second metallic doubler 146 and a further reduction in the overall weight of the metallic structure 100.

In one or more examples, the fourth-junction boundary 156 and the third-junction boundary 150 completely overlap each other when each point along the fourth-junction boundary 156 is viewed in the direction, perpendicular to the fourth-metallic-sheet first surface 142. The fourth-junction boundary 156 and the third-junction boundary 150 completely overlapping each other facilitates a minimization of the third-junction area A3, which provides a further reduction in the size of the second metallic doubler 146 and a further reduction in the overall weight of the metallic structure 100.

In one or more examples, the third-junction area A3 is at least one percent larger than the fourth-junction area A4. In one or more examples, the third-junction area A3 is at least two percent larger than the fourth-junction area A4. In one or more examples, the third-junction area A3 is at least five percent larger than the fourth-junction area A4. In one or more examples, the third-junction area A3 is at least ten percent larger than the fourth-junction area A4.

In the above examples, the third-junction area A3 being larger than the fourth-junction area A4 to some extent provides a sufficient area of the third-junction boundary 150 of the second metallic doubler 146 that extends beyond and that underlies the fourth-junction boundary 156 of the second metallic article 152 for forming the second metallic article 152 on or joining the second metallic article 152 to the fourth metallic sheet 130, while minimizing the overall size of the second metallic doubler 146.

Figure 19:
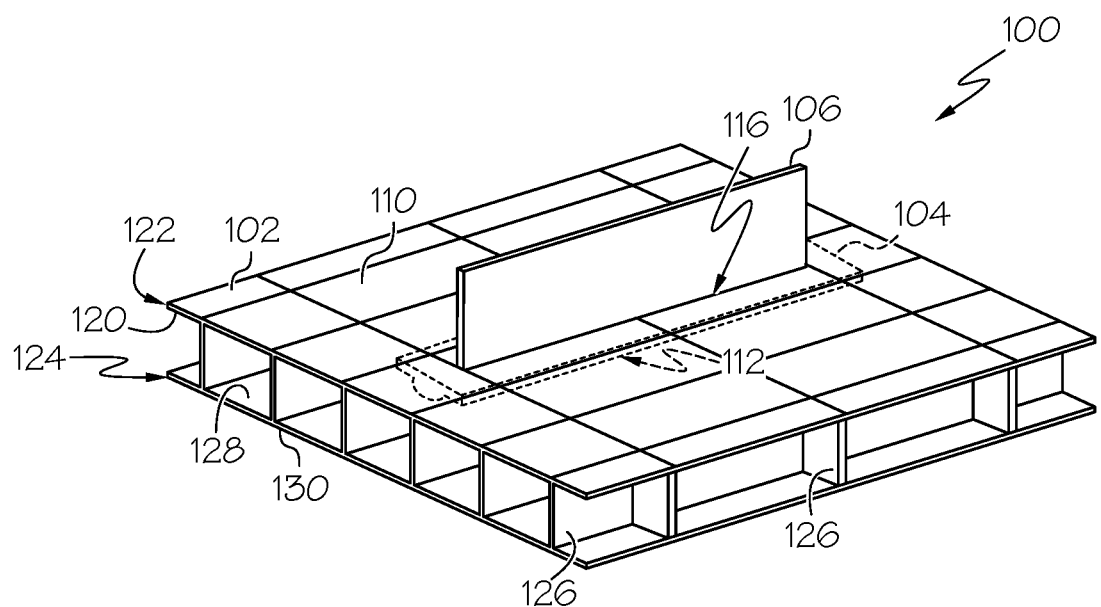
FIG. 19 is a schematic, perspective view of an example of a portion of the metallic structure, shown in FIG. 4.
Figure 20:
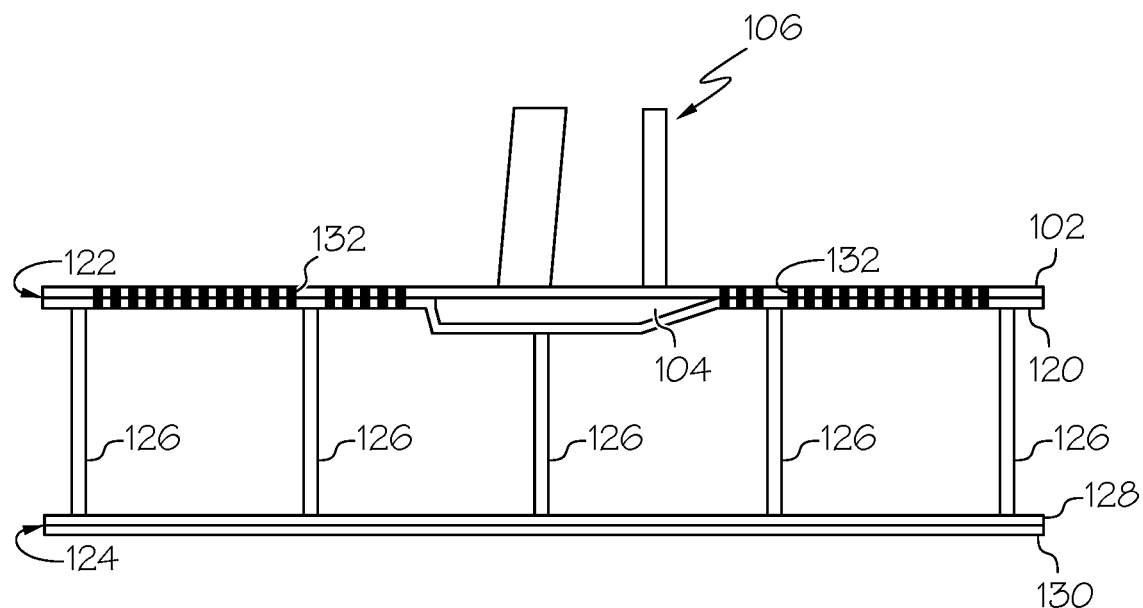
FIG. 20 is a schematic, elevation, sectional view of an example of a portion of the metallic structure, shown in FIG. 4.

Referring now to FIGS. 19 and 20, which illustrate examples of a portion of the metallic structure 100. In the illustrative examples, the metallic structure 100 takes the form of an expanded sandwich structure that includes a honeycomb-like core situated (e.g., sandwiched) between a pair of outer face panels. In one or more examples, the metallic sheet 102, the metallic doubler 104, and the second metallic sheet 120 form a first metallic face panel 122 (e.g., a first metallic laminate). The third metallic sheet 128 and the fourth metallic sheet 130 form a second metallic face panel 124 (e.g., a second metallic laminate) that is opposite, that is spaced away from, and that faces the first metallic face panel 122. The webs 126 extend between the first metallic face panel 122 and the second metallic face panel 124 and form the honeycomb-like core. The metallic article 106 is formed on the metallic-sheet second surface 110 using an additive manufacturing technique such that the second junction 116, between the metallic article 106 and the metallic-sheet second surface 110, is situated within the first junction 112, between the metallic doubler 104 and the metallic-sheet first surface 108.

In the examples shown in FIGS. 19 and 20, the metallic structure 100 is generally planar. However, in other examples, one or more portions of the metallic structure 100 may be curved or the metallic structure 100 may include one or more non-planar portions.

While not shown in the examples illustrated in FIGS. 19 and 20, in other examples of the metallic structure 100, the second metallic face panel 124 may include the second metallic doubler 146 that is situated between the third metallic sheet 128 and the fourth metallic sheet 130 (e.g., as shown in FIGS. 16-18). The second metallic article 152 may be formed on the fourth-metallic-sheet second surface 144 using an additive manufacturing technique such that the fourth junction 154, between the second metallic article 152 and the fourth-metallic-sheet second surface 144, is situated within the third junction 148, between the second metallic doubler 146 and the fourth-metallic-sheet first surface 142.

Figure 21:
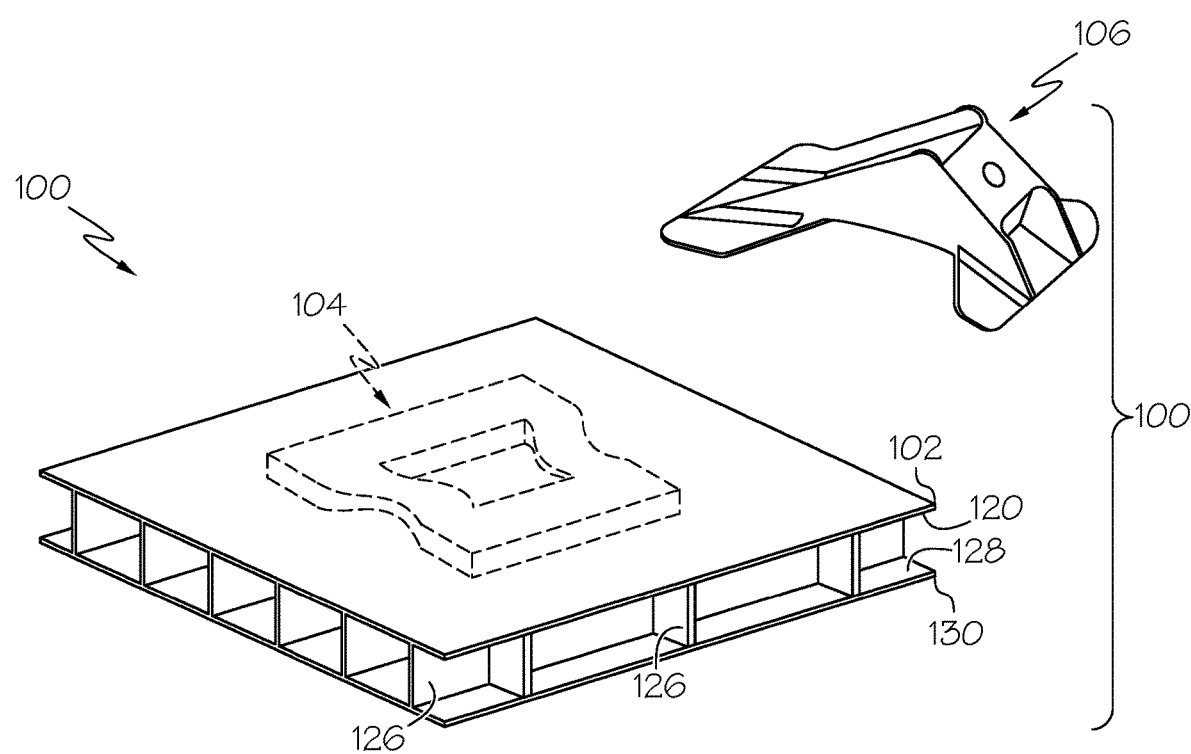
FIG. 21 is a schematic, perspective, partially exploded view of an example of a portion of the metallic structure, shown in FIG. 4.
Figure 22:
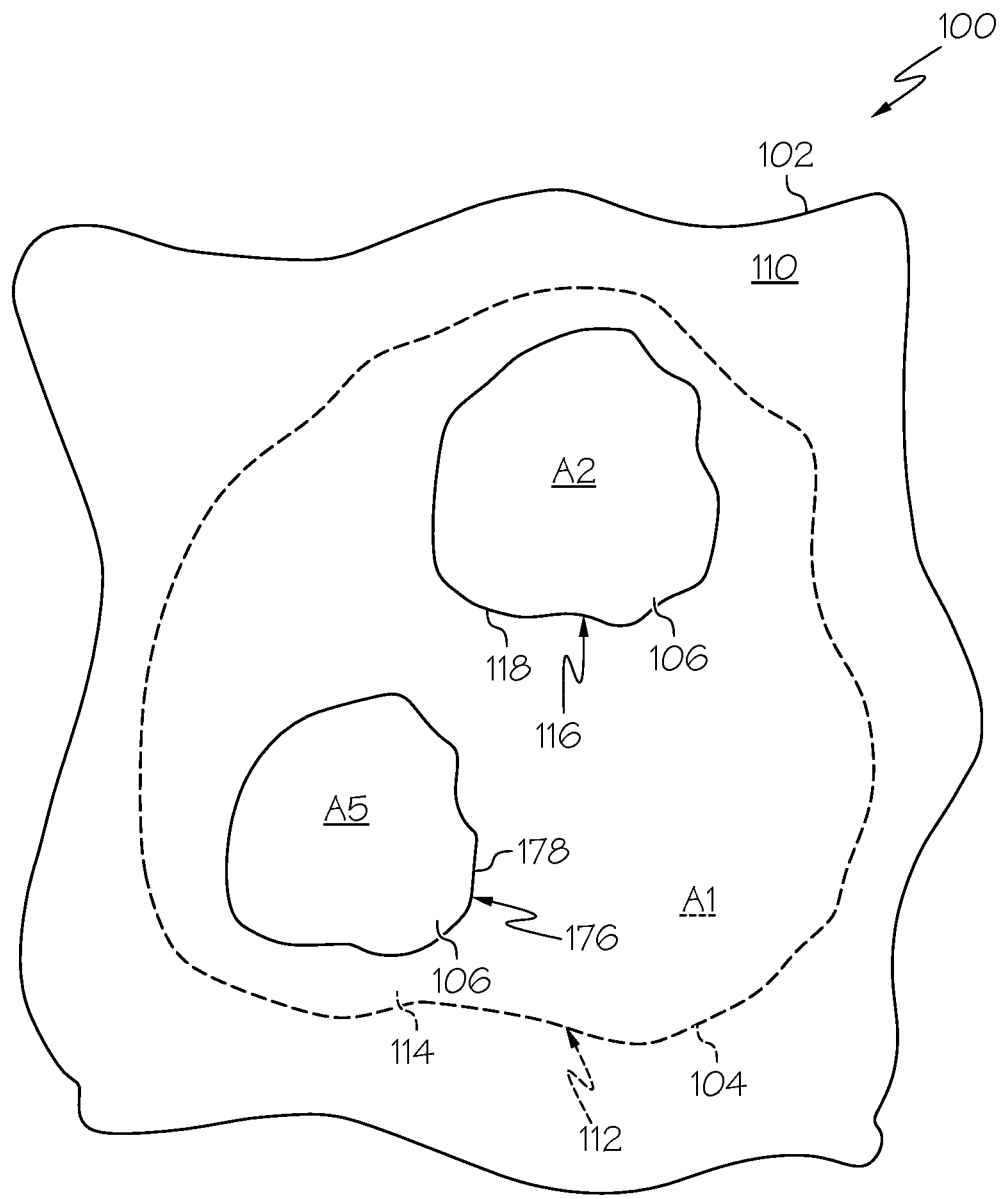
FIG. 22 is a schematic, plan view of an example of a portion of the metallic structure, shown in FIG. 4.
Figure 23:
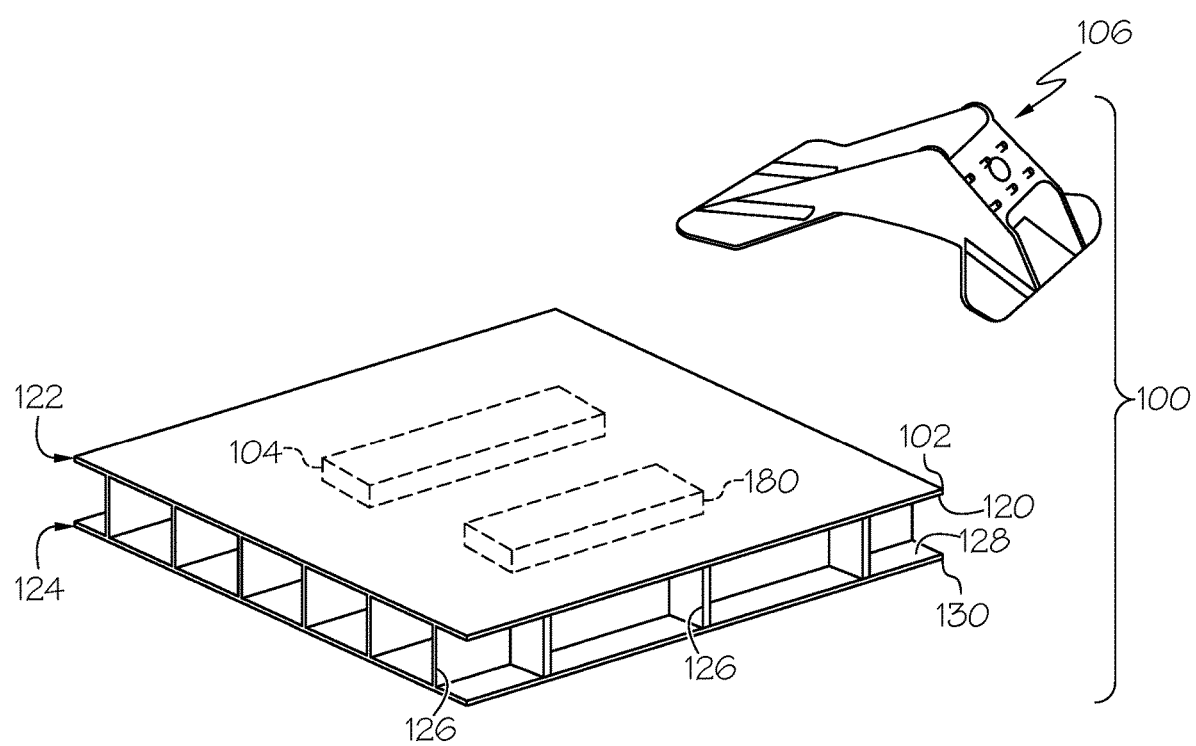
FIG. 23 is a schematic, perspective, partially exploded view of an example of a portion of the metallic structure, shown in FIG. 4.

Referring generally to FIG. 1 and particularly to FIGS. 20-22, in one or more examples, the metallic article 106 has a complex shape in which the metallic article 106 extends from (e.g., is formed on or joined to) the metallic-sheet second surface 110 at more than one location. In one or more examples, the metallic article 106 includes a first portion and a second portion. The first portion and the second portion are spaced apart from each other. The first portion and the second portion of the metallic article 106 extend from the metallic-sheet second surface 110 at two locations that are spaced apart from each other.

Referring generally to FIG. 4 and particularly to FIG. 22, in one or more examples, the metallic structure 100 includes a fifth junction 176 between a second portion of the metallic-sheet second surface 110 and the metallic article 106 (e.g., the second portion of the metallic article 106). The fifth junction 176 has a fifth-junction boundary 178 that circumscribes and defines a fifth-junction area A5. When viewed at any point along the fifth-junction boundary 178 in the direction, perpendicular to the metallic-sheet first surface 108, the fifth-junction boundary 178 does not extend outside the first-junction boundary 114.

Addition of the fifth junction 176 enables the metallic doubler 104 to provide a structural backup for forming the metallic article 106 on or joining the metallic article 106 to different portions of the metallic-sheet second surface 110. This configuration provides additional strength to the metallic structure 100, particularly, in regions formed along the second junction 116 and the fifth junction 176. The metallic doubler 104 also facilitates improved and efficient transfer of heat away from the metallic sheet 102 when heat is used to form or join the first portion and the second portion of the metallic article 106, such as during additive manufacturing of the metallic article 106 on the metallic-sheet second surface 110 or welding of the metallic article 106 to the metallic-sheet second surface 110.

As illustrated in FIGS. 20-22, in one or more examples, the first portion of the metallic article 106 extends from the first portion of the metallic-sheet second surface 110 at the second junction 116 and the second portion of the metallic article 106 extends from the second portion of the metallic-sheet second surface 110 at the fifth junction 176. The geometry of the metallic doubler 104 is tailored (e.g., has a unique size and/or two-dimensional shape in the direction, perpendicular to the metallic-sheet first surface 108, and cross-sectional thickness in the plane P, intersecting the metallic doubler 104 and perpendicular to the metallic-sheet first surface 108) for the geometry of the metallic article 106, such as of the first portion and the second portion of the metallic article 106.

In one or more examples, like the example illustrated in FIG. 6, in the plane P, intersecting the metallic doubler 104 and perpendicular to the metallic-sheet first surface 108, the metallic doubler 104 has variations in its cross-sectional thickness within the first-junction boundary 114 along the fifth junction 176. In one or more examples, like the example illustrated in FIG. 6, in the plane P, intersecting the metallic doubler 104 and perpendicular to the metallic-sheet first surface 108, the second portion of the metallic article 106 has variations in its cross-sectional thickness within the fifth-junction boundary 178.

The fifth-junction boundary 178 not extending outside (e.g., beyond) the first-junction boundary 114 refers to an entirety of the fifth-junction area A5 being situated within or being surrounded by the first-junction area A1. The fifth-junction boundary 178 not extending outside the first-junction boundary 114 facilitates an entirety of the metallic article 106 being located over and being backed-up by the metallic doubler 104 when viewed at any point within the fifth-junction area A5 in the direction, perpendicular to the metallic-sheet first surface 108. This configuration may be particularly advantageous in examples where heat is used to form the metallic article 106 on or otherwise join the metallic article 106 to the metallic sheet 102 at a plurality of locations.

For illustration purposes, FIG. 22 shows the fifth-junction boundary 178 as not having a definite shape. The fifth-junction boundary 178 can have any two-dimensional geometry, when viewed at any point along the fifth-junction boundary 178 in the direction, perpendicular to the metallic-sheet first surface 108, such as circular, square, rectangular, and the like. The fifth-junction boundary 178 can have a regular two-dimensional geometry or an irregular two-dimensional geometry. The fifth-junction boundary 178 can be symmetric or asymmetric.

In one or more examples, at least one point along the fifth-junction boundary 178 overlaps at least one point along the first-junction boundary 114 when at least the one point along the fifth-junction boundary 178 is viewed in the direction, perpendicular to the metallic-sheet first surface 108. In one or more examples, at least one segment of the fifth-junction boundary 178 overlaps at least one segment of the first-junction boundary 114 when each point along at least the one segment of the fifth-junction boundary 178 is viewed in the direction, perpendicular to the metallic-sheet first surface 108.

In one or more examples, at least two points along the fifth-junction boundary 178 overlap at least two corresponding points along the first-junction boundary 114 when each of at least the two points along the fifth-junction boundary 178 is viewed in the direction, perpendicular to the metallic-sheet first surface 108. At least the two points along the fifth-junction boundary 178 are spaced apart from each other. In one or more examples, at least two segments of the fifth-junction boundary 178 overlap at least two corresponding segments of the first-junction boundary 114 when each point along any one of at least the two segments of the fifth-junction boundary 178 is viewed in the direction, perpendicular to the metallic-sheet first surface 108. At least the two segments of the fifth-junction boundary 178 are spaced apart from each other.

Figure 24:
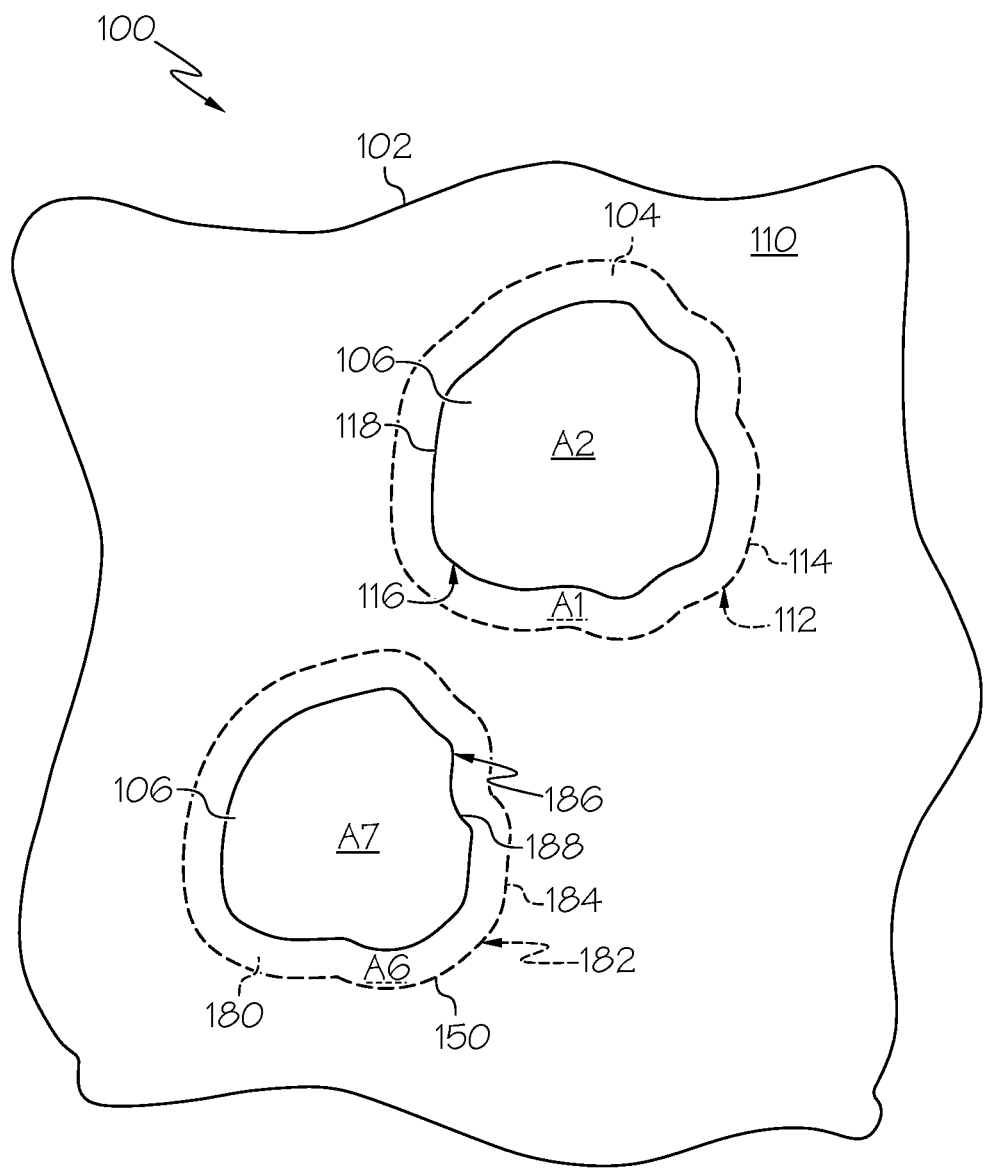
FIG. 24 is a schematic, plan view of an example of a portion of the metallic structure, shown in FIG. 4.
Figure 25:
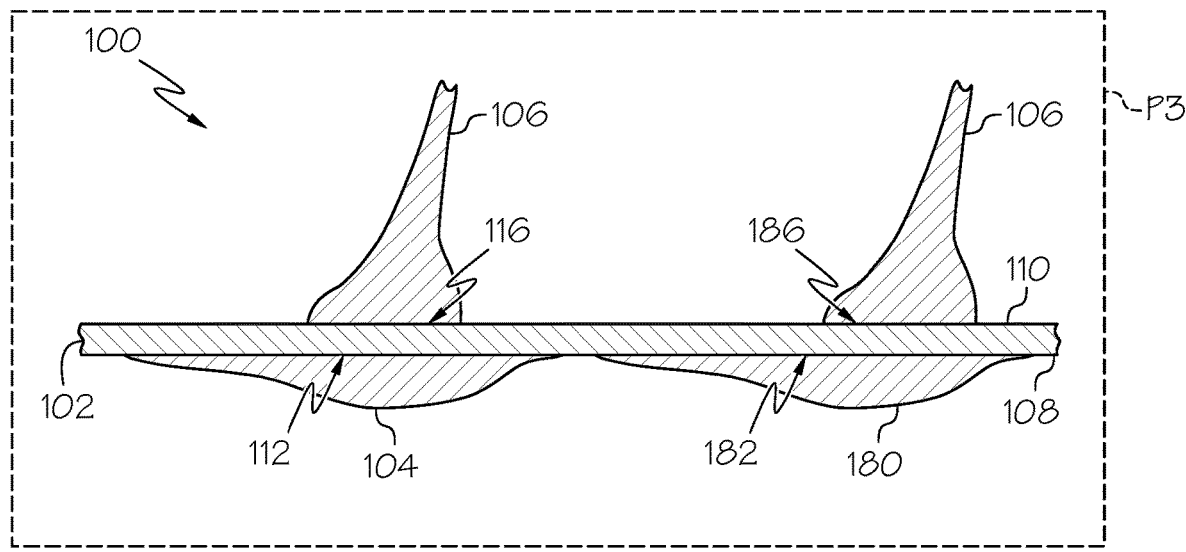
FIG. 25 is a schematic, elevation, sectional view of an example of a portion of the metallic structure, shown in FIG. 4.
Figure 26:
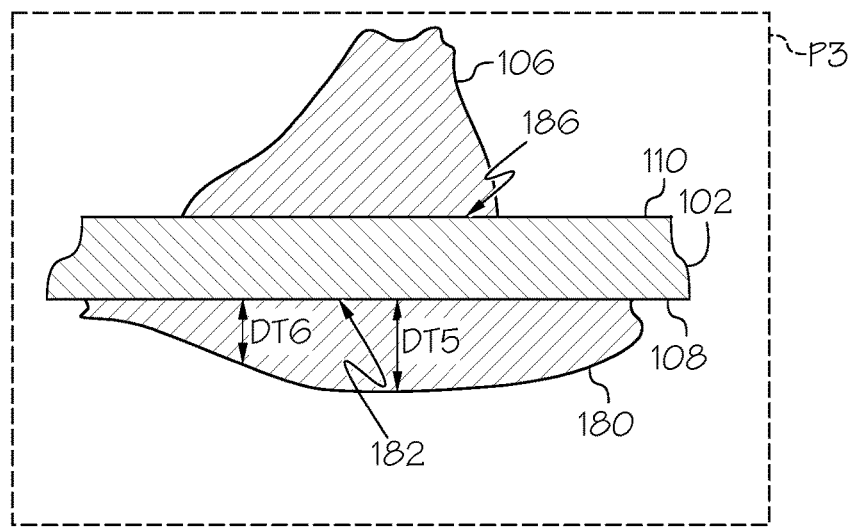
FIG. 26 is a schematic, elevation, sectional view of an example of a portion of the metallic structure, shown in FIG. 4.

Referring generally to FIG. 4 and particularly to FIGS. 23-26, in one or more examples, the metallic structure 100 includes a third metallic doubler 180. The third metallic doubler 180 extends from a third portion of the metallic-sheet first surface 108. The metallic structure 100 includes a sixth junction 182 between the third portion of the metallic-sheet first surface 108 and the third metallic doubler 180. The metallic structure 100 includes a seventh junction 186 between a third portion of the metallic-sheet second surface 110 and the metallic article 106. The sixth junction 182 has a sixth-junction boundary 184 that circumscribes and defines a sixth-junction area A6. The seventh junction 186 has a seventh-junction boundary 188 that circumscribes and defines a seventh-junction area A7. When viewed at any point along the seventh-junction boundary 188 in the direction, perpendicular to the metallic-sheet first surface 108, the seventh-junction boundary 188 does not extend outside the sixth-junction boundary 184 (e.g., as shown in FIG. 24). In a third plane P3, intersecting the third metallic doubler 180 and perpendicular to the metallic-sheet first surface 108, the third metallic doubler 180 has at least a fifth doubler thickness DT5 and a sixth doubler thickness DT6, which is less than the fifth doubler thickness DT5 (e.g., as shown in FIG. 26).

The metallic sheet 102, the metallic doubler 104, and the third metallic doubler 180 form at least a portion of the metallic base structure (e.g., a metallic laminate, such as the first metallic face panel 122) for the metallic structure 100. The third metallic doubler 180 provides a structural backup for forming the second portion of the metallic article 106 on or joining the second portion of the metallic article 106 to the third portion of the metallic-sheet second surface 110. This configuration provides additional strength to the metallic structure 100, particularly, in a region formed along the seventh junction 186. The third metallic doubler 180 also facilitates improved and efficient transfer of heat away from the metallic sheet 102 when heat is used to form or join the second portion of the metallic article 106, such as during additive manufacturing of the metallic article 106 on the metallic-sheet second surface 110 or welding of the metallic article 106 to the metallic-sheet second surface 110.

While not explicitly illustrated in FIGS. 25 and 26, in one or more examples, the metallic structure 100 includes the second metallic sheet 120 and the third metallic doubler 180 is sandwiched between the metallic-sheet first surface 108 and the second-metallic-sheet first surface 134. In one or more examples, the second metallic sheet 120 is coupled to the third metallic doubler 180.

The seventh-junction boundary 188 not extending outside (e.g., beyond) the sixth-junction boundary 184 refers to an entirety of the seventh-junction area A7 being situated within or being surrounded by the sixth-junction area A6. The seventh-junction boundary 188 not extending outside the sixth-junction boundary 184 facilitates an entirety of the second portion of the metallic article 106 being located over and being backed-up by the third metallic doubler 180 when viewed at any point within the seventh-junction area A7 in the direction, perpendicular to the metallic-sheet first surface 108. This configuration may be particularly advantageous in examples where heat is used to form the metallic article 106 on or otherwise join the metallic article 106 to the metallic sheet 102.

In the third plane P3, intersecting the third metallic doubler 180 and perpendicular to the metallic-sheet first surface 108, the sixth doubler thickness DT6 being less than fifth doubler thickness DT5 and/or other variations in the cross-sectional thickness of the third metallic doubler 180 enables a geometry of the third metallic doubler 180 (e.g., a size and/or a two-dimensional shape of the third metallic doubler 180 in the direction, perpendicular to the metallic-sheet first surface 108, and a cross-sectional thickness of the third metallic doubler 180 in the third plane P3, intersecting the third metallic doubler 180 and perpendicular to the metallic-sheet first surface 108) to be tailored based on a size, configuration, type, or application of the metallic article 106. Tailoring the geometry of the third metallic doubler 180 may beneficially facilitate an overall reduction in the thickness and/or the weight of the metallic structure 100.

In one or more examples, the third portion of the metallic-sheet first surface 108 is coupled to the third metallic doubler 180. The metallic sheet 102 and the third metallic doubler 180 can be coupled together using any one of various techniques. In an example, the metallic sheet 102 and the third metallic doubler 180 are diffusion bonded (e.g., coupled together by diffusion bonding or other solid-state welding techniques). In another example, the metallic sheet 102 and the third metallic doubler 180 are welded. In another example, the metallic sheet 102 and the third metallic doubler 180 are adhesively bonded (e.g., coupled together using an adhesive material).

In one or more examples, the metallic sheet 102 and the third metallic doubler 180 are planar (e.g., having a generally flat profile) in the third plane P3, intersecting the third metallic doubler 180 and perpendicular to the metallic-sheet first surface 108. In one or more examples, the metallic sheet 102 and the third metallic doubler 180 are curved (e.g., having a contour, one or more nonplanar portions, or a complex shape) in the third plane P3, intersecting the third metallic doubler 180 and perpendicular to the metallic-sheet first surface 108.

For illustration purposes, FIG. 24 shows the sixth-junction boundary 184 and seventh-junction boundary 188 as not having definite shapes. The sixth-junction boundary 184 can have any two-dimensional geometry, when viewed at any point along the sixth-junction boundary 184 in the direction, perpendicular to the metallic-sheet first surface 108, such as circular, square, rectangular, and the like. The sixth-junction boundary 184 can have a regular two-dimensional geometry or an irregular two-dimensional geometry. The sixth-junction boundary 184 can be symmetric or asymmetric. Similarly, the seventh-junction boundary 188 can have any two-dimensional geometry, when viewed at any point along the seventh-junction boundary 188 in the direction, perpendicular to the metallic-sheet first surface 108, such as circular, square, rectangular, and the like. The seventh-junction boundary 188 can have a regular two-dimensional geometry or an irregular two-dimensional geometry. The seventh-junction boundary 188 can be symmetric or asymmetric.

In one or more examples, like the example illustrated in FIG. 6, in the third plane P3, intersecting the third metallic doubler 180 and perpendicular to the metallic-sheet first surface 108, the second portion of the metallic article 106 has variations in its cross-sectional thickness within the seventh-junction boundary 188 (e.g., as shown in FIGS. 25 and 26).

In one or more examples, at least one point along the seventh-junction boundary 188 overlaps at least one point along the sixth-junction boundary 184 when at least the one point along the seventh-junction boundary 188 is viewed in the direction, perpendicular to the metallic-sheet first surface 108. In one or more examples, at least one segment of the seventh-junction boundary 188 overlaps at least one segment of the sixth-junction boundary 184 when each point along at least the one segment of the seventh-junction boundary 188 is viewed in the direction, perpendicular to the metallic-sheet first surface 108.

In one or more examples, at least two points along the seventh-junction boundary 188 overlap at least two corresponding points along the sixth-junction boundary 184 when each of at least the two points along the seventh-junction boundary 188 is viewed in the direction, perpendicular to the metallic-sheet first surface 108. At least the two points along the seventh-junction boundary 188 are spaced apart from each other. In one or more examples, at least two segments of the seventh-junction boundary 188 overlap at least two corresponding segments of the sixth-junction boundary 184 when each point along any one of at least the two segments of the seventh-junction boundary 188 is viewed in the direction, perpendicular to the metallic-sheet first surface 108. At least the two segments of the seventh-junction boundary 188 are spaced apart from each other.

In one or more examples, the seventh-junction boundary 188 and the sixth-junction boundary 184 completely overlap each other when each point along the seventh-junction boundary 188 is viewed in the direction, perpendicular to the metallic-sheet first surface 108.

In one or more examples, the sixth-junction area A6 is at least one percent larger than the seventh-junction area A7. In one or more examples, the sixth-junction area A6 is at least two percent larger than the seventh-junction area A7. In one or more examples, the sixth-junction area A6 is at least five percent larger than the seventh-junction area A7. In one or more examples, the sixth-junction area A6 is at least ten percent larger than the seventh-junction area A7.

Figure 27:
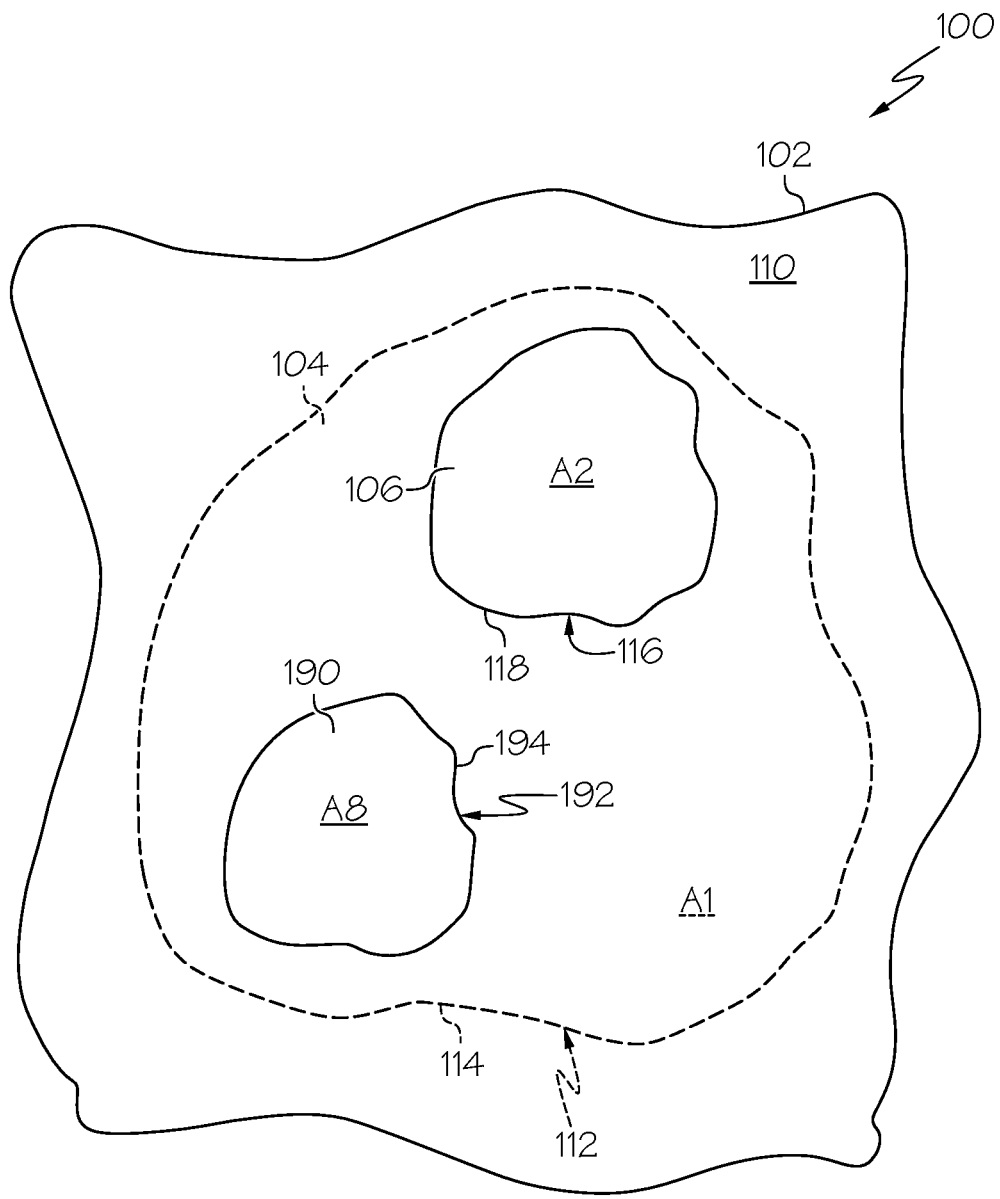
FIG. 27 is a schematic, plan view of an example of a portion of the metallic structure, shown in FIG. 4.

Referring generally to FIG. 4 and particularly to FIG. 27, in one or more examples, the metallic structure 100 includes a third metallic article 190. The third metallic article 190 extends from a fourth portion of the metallic-sheet second surface 110. The metallic structure 100 includes an eighth junction 192 between the fourth portion of the metallic-sheet second surface 110 and the third metallic article 190. The eighth junction 192 has an eighth-junction boundary 194 that circumscribes and defines an eighth-junction area A8. When viewed at any point along the eighth-junction boundary 194 in the direction, perpendicular to the metallic-sheet first surface 108, the eighth-junction boundary 194 does not extend outside the first-junction boundary 114.

The geometry of the metallic doubler 104 is tailored (e.g., has a unique size and/or two-dimensional shape in the direction, perpendicular to the metallic-sheet first surface 108, and cross-sectional thickness in the plane P, intersecting the metallic doubler 104 and perpendicular to the metallic-sheet first surface 108) for the geometry of the third metallic article 190.

In one or more examples, like the example illustrated in FIG. 6, in the plane P, intersecting the metallic doubler 104 and perpendicular to the metallic-sheet first surface 108, the metallic doubler 104 has variations in its cross-sectional thickness within the first-junction boundary 114 along the eighth junction 192. In one or more examples, like the example illustrated in FIG. 6, in the plane P, intersecting the metallic doubler 104 and perpendicular to the metallic-sheet first surface 108, the third metallic article 190 has variations in its cross-sectional thickness within the eighth-junction boundary 194.

The eighth-junction boundary 194 not extending outside (e.g., beyond) the first-junction boundary 114 refers to an entirety of the eighth-junction area A8 being situated within or being surrounded by the first-junction area A1. The eighth-junction boundary 194 not extending outside the first-junction boundary 114 facilitates an entirety of the third metallic article 190 being located over and being backed-up by a portion of the metallic doubler 104 when viewed at any point within the eighth-junction area A8 in the direction, perpendicular to the metallic-sheet first surface 108. This configuration may be particularly advantageous in examples where heat is used to form the third metallic article 190 on or otherwise join the third metallic article 190 to the metallic sheet 102.

For illustration purposes, FIG. 27 shows the eighth-junction boundary 194 as not having a definite shape. The eighth-junction boundary 194 can have any two-dimensional geometry, when viewed at any point along the eighth-junction boundary 194 in the direction, perpendicular to the metallic-sheet first surface 108, such as circular, square, rectangular, and the like. The eighth-junction boundary 194 can have a regular two-dimensional geometry or an irregular two-dimensional geometry. The eighth-junction boundary 194 can be symmetric or asymmetric.

In one or more examples, at least one point along the eighth-junction boundary 194 overlaps at least one point along the first-junction boundary 114 when at least the one point along the eighth-junction boundary 194 is viewed in the direction, perpendicular to the metallic-sheet first surface 108. In one or more examples, at least one segment of the eighth-junction boundary 194 overlaps at least one segment of the first-junction boundary 114 when each point along at least the one segment of the eighth-junction boundary 194 is viewed in the direction, perpendicular to the metallic-sheet first surface 108.

In one or more examples, at least two points along the eighth-junction boundary 194 overlap at least two corresponding points along the first-junction boundary 114 when each of at least the two points along the eighth-junction boundary 194 is viewed in the direction, perpendicular to the metallic-sheet first surface 108. At least the two points along the eighth-junction boundary 194 are spaced apart from each other. In one or more examples, at least two segments of the eighth-junction boundary 194 overlap at least two corresponding segments of the first-junction boundary 114 when each point along any one of at least the two segments of the eighth-junction boundary 194 is viewed in the direction, perpendicular to the metallic-sheet first surface 108. At least the two segments of the eighth-junction boundary 194 are spaced apart from each other.

Figure 28:
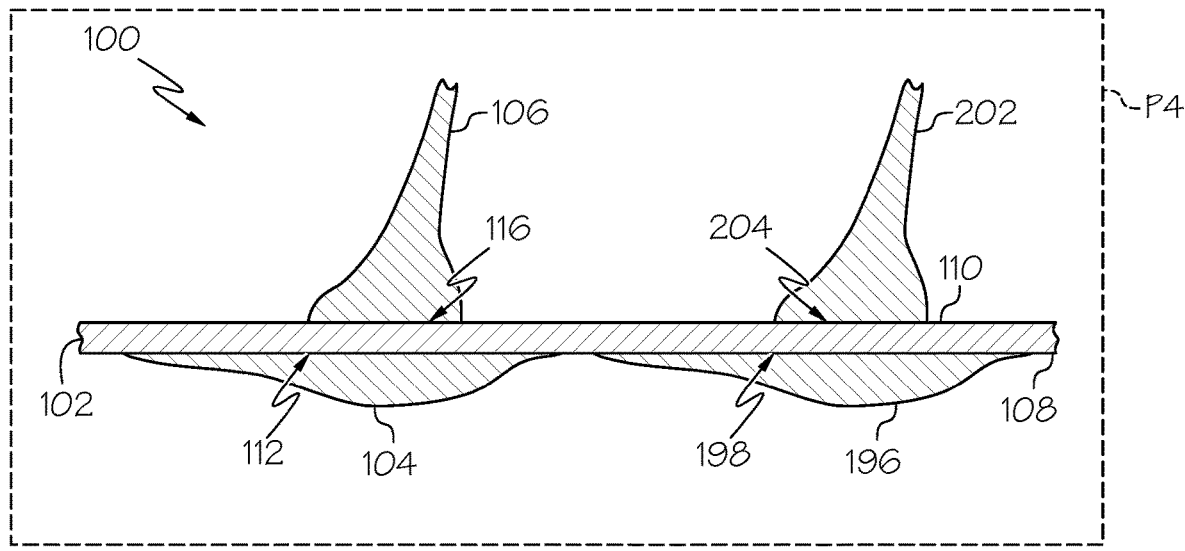
FIG. 28 is a schematic, elevation, sectional view of an example of a portion of the metallic structure, shown in FIG. 4.
Figure 29:
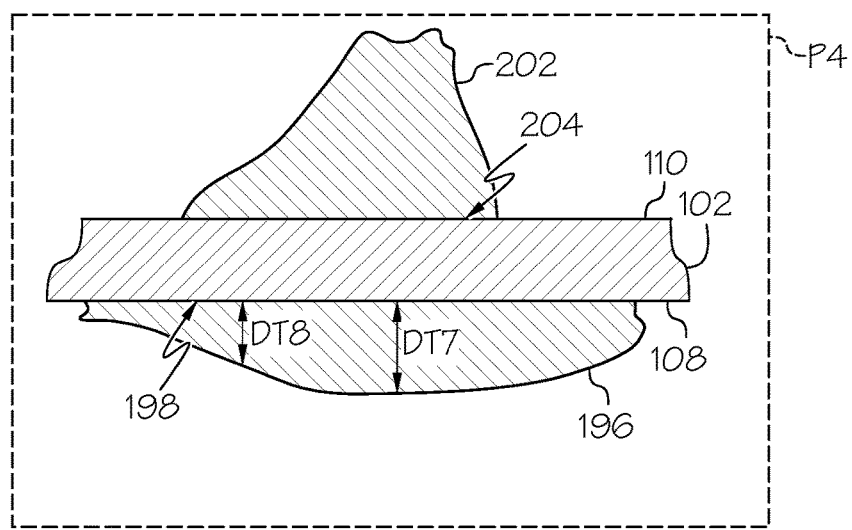
FIG. 29 is a schematic, elevation, sectional view of an example of a portion of the metallic structure, shown in FIG. 4.
Figure 30:
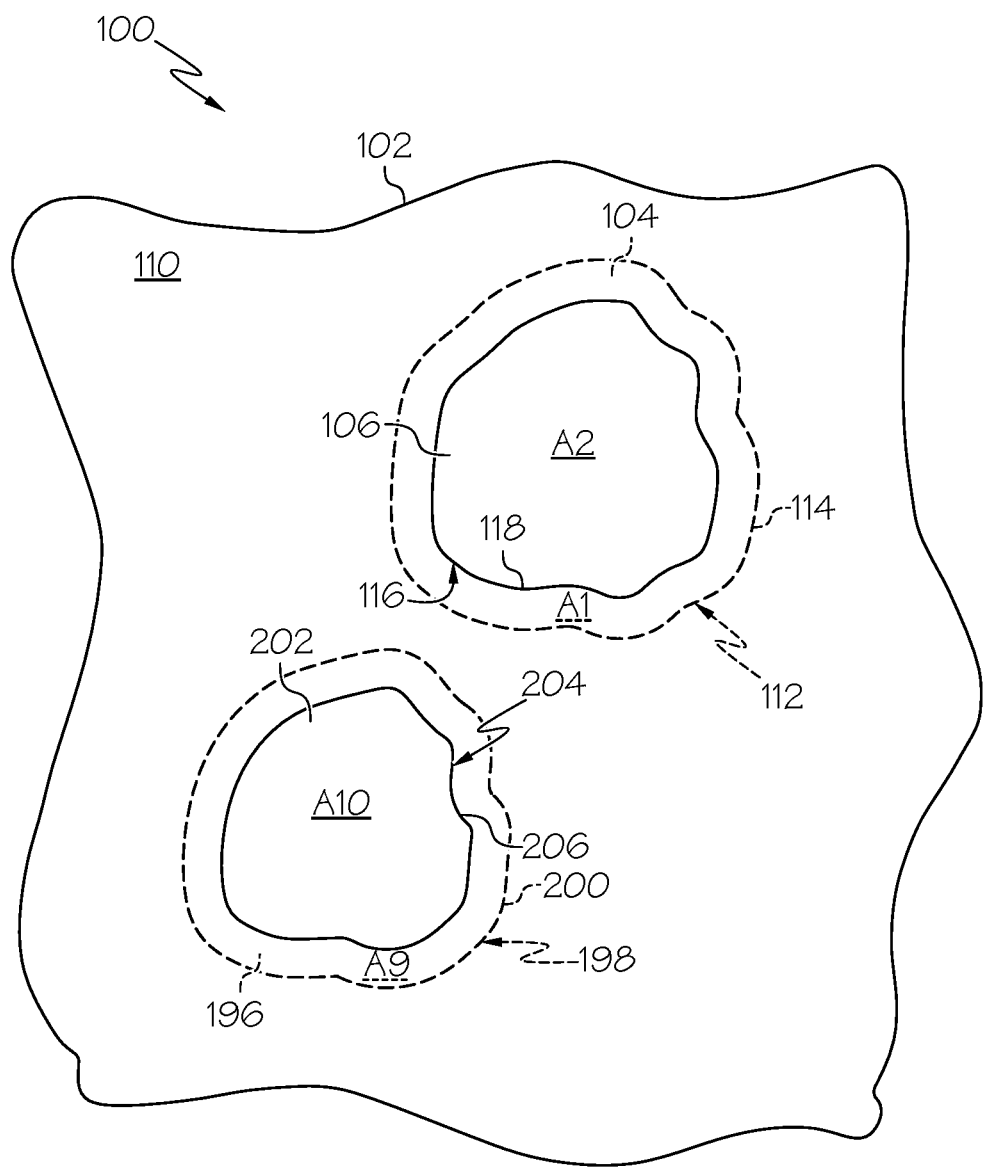
FIG. 30 is a schematic, plan view of an example of a portion of the metallic structure, shown in FIG. 4.

Referring generally to FIG. 4 and particularly to FIGS. 28-30, in one or more examples, the metallic structure 100 includes a fourth metallic doubler 196 and a fourth metallic article 202. The fourth metallic doubler 196 extends from a fourth portion of the metallic-sheet first surface 108. The fourth metallic article 202 extends from a fourth portion of the metallic-sheet second surface 110. The metallic structure 100 includes a ninth junction 198 between the fourth portion of the metallic-sheet first surface 108 and the fourth metallic doubler 196. The metallic structure 100 includes a tenth junction 204 between the fourth portion of the metallic-sheet second surface 110 and the second metallic article 152. The ninth junction 198 has a ninth-junction boundary 200 that circumscribes and defines a ninth-junction area A9. The tenth junction 204 has a tenth-junction boundary 206 that circumscribes and defines a tenth-junction area A10. When viewed at any point along the tenth-junction boundary 206 in a direction, perpendicular to the metallic-sheet first surface 108, the tenth-junction boundary 206 does not extend outside the ninth-junction boundary 200 (e.g., as shown in FIG. 30). In a fourth plane P4, intersecting the fourth metallic doubler 196 and perpendicular to the metallic-sheet first surface 108, the fourth metallic doubler 196 has at least a seventh doubler thickness DT7 and an eighth doubler thickness DT8, which is less than the seventh doubler thickness DT7 (e.g., as shown in FIG. 29).

The metallic sheet 102, the metallic doubler 104, and the fourth metallic doubler 196 form at least a portion of the metallic base structure (e.g., a metallic laminate, such as the first metallic face panel 122) for the metallic structure 100. The fourth metallic doubler 196 provides a structural backup for forming the fourth metallic article 202 on or joining the fourth metallic article 202 to the fourth portion of the metallic-sheet second surface 110. This configuration provides additional strength to the metallic structure 100, particularly, in a region formed along the tenth junction 204. The fourth metallic doubler 196 also facilitates improved and efficient transfer of heat away from the metallic sheet 102 when heat is used to form or join the fourth metallic article 202, such as during additive manufacturing of the fourth metallic article 202 on the metallic-sheet second surface 110 or welding of the fourth metallic article 202 to the metallic-sheet second surface 110.

The tenth-junction boundary 206 not extending outside (e.g., beyond) the ninth-junction boundary 200 refers to an entirety of the tenth-junction area A10 being situated within or being surrounded by the ninth-junction area A9. The tenth-junction boundary 206 not extending outside the ninth-junction boundary 200 facilitates an entirety of the fourth metallic article 202 being located over and being backed-up by the fourth metallic doubler 196 when viewed at any point within the tenth-junction area A10 in the direction, perpendicular to the metallic-sheet first surface 108. This configuration may be particularly advantageous in examples where heat is used to form the fourth metallic article 202 on or otherwise join the fourth metallic article 202 to the metallic sheet 102.

In the fourth plane P4, intersecting the fourth metallic doubler 196 and perpendicular to the metallic-sheet first surface 108, the eighth doubler thickness DT8 being less than seventh doubler thickness DT7 and/or other variations in the cross-sectional thickness of the fourth metallic doubler 196 enables a geometry of the fourth metallic doubler 196 (e.g., a size and/or a two-dimensional shape of the fourth metallic doubler 196 in the direction, perpendicular to the metallic-sheet first surface 108, and a cross-sectional thickness of the fourth metallic doubler 196 in the fourth plane P4, intersecting the fourth metallic doubler 196 and perpendicular to the metallic-sheet first surface 108) to be tailored based on a size, configuration, type, or application of the fourth metallic article 202. Tailoring the geometry of the fourth metallic doubler 196 may beneficially facilitate an overall reduction in the thickness and/or the weight of the metallic structure 100.

In one or more examples, the fourth portion of the metallic-sheet first surface 108 is coupled to the fourth metallic doubler 196. The metallic sheet 102 and the fourth metallic doubler 196 can be coupled together using any one of various techniques. In an example, the metallic sheet 102 and the fourth metallic doubler 196 are diffusion bonded (e.g., coupled together by diffusion bonding or other solid-state welding techniques). In another example, the metallic sheet 102 and the fourth metallic doubler 196 are welded. In another example, the metallic sheet 102 and the fourth metallic doubler 196 are adhesively bonded (e.g., coupled together using an adhesive material).

While not explicitly illustrated in FIGS. 28 and 29, in one or more examples, the metallic structure 100 includes the second metallic sheet 120 and the fourth metallic doubler 196 is sandwiched between the metallic-sheet first surface 108 and the second-metallic-sheet first surface 134. In one or more examples, the second metallic sheet 120 is coupled to the fourth metallic doubler 196.

In one or more examples, the metallic sheet 102 and the fourth metallic doubler 196 are planar (e.g., having a generally flat profile) in the fourth plane P4, intersecting the fourth metallic doubler 196 and perpendicular to the metallic-sheet first surface 108. In one or more examples, the metallic sheet 102 and the fourth metallic doubler 196 are curved (e.g., having a contour, one or more nonplanar portions, or a complex shape) in the fourth plane P4, intersecting the fourth metallic doubler 196 and perpendicular to the metallic-sheet first surface 108.

For illustration purposes, FIG. 30 shows the ninth-junction boundary 200 and tenth-junction boundary 206 as not having definite shapes. The ninth-junction boundary 200 can have any two-dimensional geometry, when viewed at any point along the ninth-junction boundary 200 in the direction, perpendicular to the metallic-sheet first surface 108, such as circular, square, rectangular, and the like. The ninth-junction boundary 200 can have a regular two-dimensional geometry or an irregular two-dimensional geometry. The ninth-junction boundary 200 can be symmetric or asymmetric. Similarly, the tenth-junction boundary 206 can have any two-dimensional geometry, when viewed at any point along the tenth-junction boundary 206 in the direction, perpendicular to the metallic-sheet first surface 108, such as circular, square, rectangular, and the like. The tenth-junction boundary 206 can have a regular two-dimensional geometry or an irregular two-dimensional geometry. The tenth-junction boundary 206 can be symmetric or asymmetric.

In one or more examples, like the example illustrated in FIG. 6, in the fourth plane P4, intersecting the fourth metallic doubler 196 and perpendicular to the metallic-sheet first surface 108, the fourth metallic article 202 has variations in its cross-sectional thickness within the tenth-junction boundary 206 (e.g., as shown in FIGS. 28 and 29).

In one or more examples, at least one point along the tenth-junction boundary 206 overlaps at least one point along the ninth-junction boundary 200 when at least the one point along the tenth-junction boundary 206 is viewed in the direction, perpendicular to the metallic-sheet first surface 108. In one or more examples, at least one segment of the tenth-junction boundary 206 overlaps at least one segment of the ninth-junction boundary 200 when each point along at least the one segment of the tenth-junction boundary 206 is viewed in the direction, perpendicular to the metallic-sheet first surface 108.

In one or more examples, at least two points along the tenth-junction boundary 206 overlap at least two corresponding points along the ninth-junction boundary 200 when each of at least the two points along the tenth-junction boundary 206 is viewed in the direction, perpendicular to the metallic-sheet first surface 108. At least the two points along the tenth-junction boundary 206 are spaced apart from each other. In one or more examples, at least two segments of the tenth-junction boundary 206 overlap at least two corresponding segments of the ninth-junction boundary 200 when each point along any one of at least the two segments of the tenth-junction boundary 206 is viewed in the direction, perpendicular to the metallic-sheet first surface 108. At least the two segments of the tenth-junction boundary 206 are spaced apart from each other.

In one or more examples, the tenth-junction boundary 206 and the ninth-junction boundary 200 completely overlap each other when each point along the tenth-junction boundary 206 is viewed in the direction, perpendicular to the metallic-sheet first surface 108.

In one or more examples, the ninth-junction area A9 is at least one percent larger than the tenth-junction area A10. In one or more examples, the ninth-junction area A9 is at least two percent larger than the tenth-junction area A10. In one or more examples, the ninth-junction area A9 is at least five percent larger than the tenth-junction area A10. In one or more examples, the ninth-junction area A9 is at least ten percent larger than the tenth-junction area A10.

Figure 31:
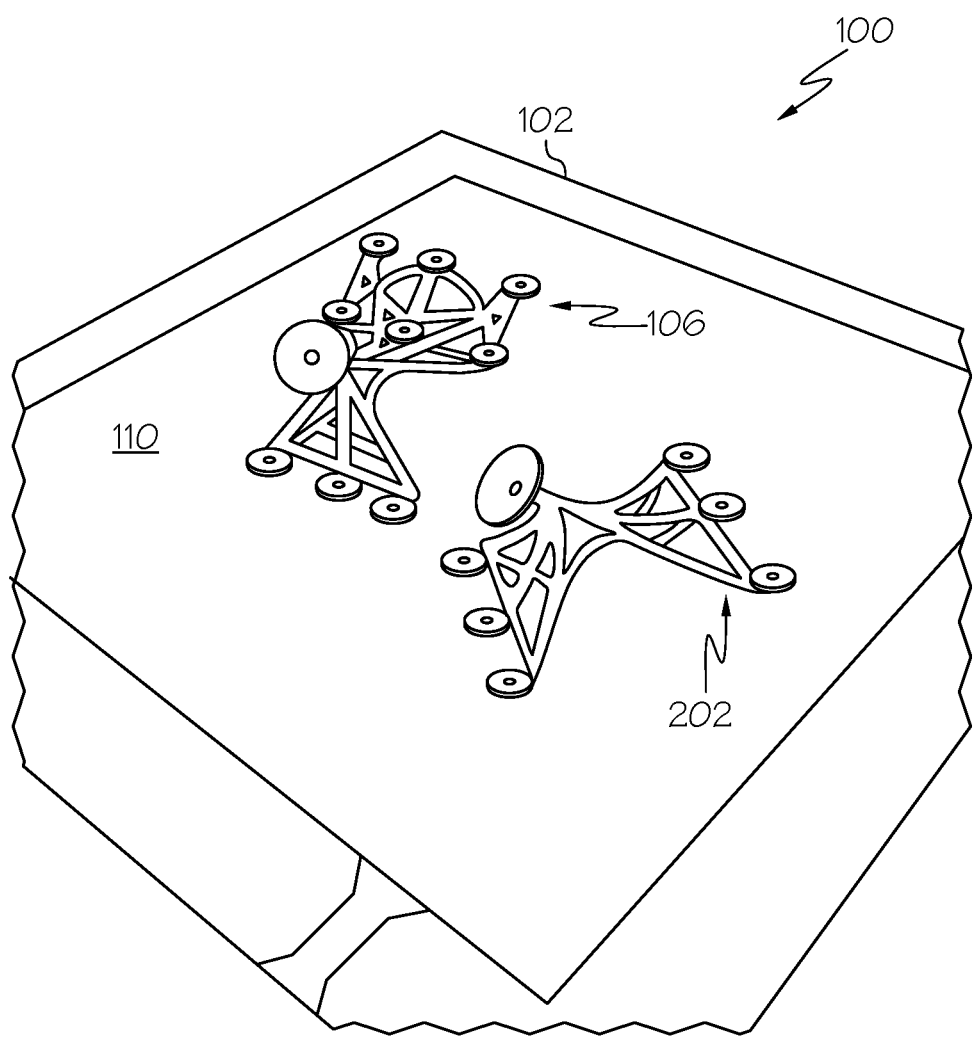
FIG. 31 is a schematic, perspective view of an example of a portion of the metallic structure, shown in FIG. 4.

FIG. 31 illustrates an example of the metallic structure 100 that includes two metallic articles (e.g., the metallic article 106 and the third metallic article 190 or the fourth metallic article 202 shown in FIGS. 5, 6, 11-15, 19-21, 28 and 29) extending from the metallic-sheet second surface 110. In one or more examples, both of the two metallic articles may be backed-up by the same metallic doubler (e.g., the metallic doubler 104 shown in FIGS. 5, 6, 11-15, 19-21). In one or more examples, each of the two metallic articles may be backed-up by a dedicated metallic doubler (e.g., the metallic doubler 104 and the fourth metallic doubler shown in FIG. 28).

In the example illustrated in FIG. 31, the metallic structure 100 includes a plurality (e.g., two or more) junctions between a plurality of portions of each one of the two metallic articles and a plurality of portions of the metallic-sheet second surface 110 (e.g., as shown in FIG. 25.) In one or more examples, each one of the junctions between the plurality of portions of each one of the two metallic articles and the plurality of portions of the metallic-sheet second surface 110 is situated within (e.g., do not extend outside of) a corresponding junction between a corresponding metallic doubler (e.g., as shown in FIGS. 21-30).

FIG. 31 illustrates examples of the metallic articles having complex geometries. In one or more examples, each one of the metallic articles is fabricated using an additive manufacturing technique. In one or more examples, each one of the metallic articles is formed on the metallic-sheet second surface 110 at a predetermined location over the metallic doubler using the additive manufacturing technique. In one or more examples, each one of the metallic articles is formed using the additive manufacturing technique and is then joined to the metallic-sheet second surface 110 at a predetermined location over the metallic doubler.

Referring generally to FIG. 4 and particularly to FIG. 20, in one or more examples, the metallic structure 100 includes perforations 132. The perforations 132 are formed through the metallic sheet 102.

In one or more examples, the perforations 132 take the form of openings that extend through an entirety of the metallic sheet 102, between the metallic-sheet first surface 108 and the metallic-sheet second surface 110. The perforations 132 are configured to attenuate (e.g., reduce) noise, for example, resulting from a flow of air over the metallic sheet 102. The perforations 132 are arranged to allow air to flow through the metallic sheet 102.

In one or more examples, the perforations 132 are not formed through the metallic doubler 104 (e.g., as shown in FIGS. 5, 6, 11-16, 19-21), the third metallic doubler 180 (e.g., shown in FIGS. 23, 25 and 26), and/or the fourth metallic doubler 196 (e.g., shown in FIGS. 28 and 29). Not forming the perforations 132 through the metallic doubler 104, the third metallic doubler 180, and/or the fourth metallic doubler 196 maintains the structural integrity of the metallic doubler 104, the third metallic doubler 180, and/or the fourth metallic doubler 196.

In one or more examples, the perforations 132 take the form of openings that extend through an entirety of the metallic sheet 102 and the second metallic sheet 120, between the metallic-sheet second surface 110 and the second-metallic-sheet second surface 136 (e.g., through an entirety of the first metallic face panel 122). The perforations 132 are configured to attenuate (e.g., reduce) noise, for example, resulting from a flow of air over the metallic sheet 102. The perforations 132 are arranged to allow air to flow through the metallic sheet 102 and the second metallic sheet 120.

In one or more examples, as illustrated in FIG. 20, the perforations 132 are arranged to allow air to flow through the metallic sheet 102 and the second metallic sheet 120 and into a core of the metallic structure 100 formed by the webs 126.

The perforations 132 (e.g., the noise attenuation openings) are not limited to any particular geometry. Examples of opening geometries include holes, ovals, ellipses, slits, and cutouts.

Referring generally to FIG. 4, in one or more examples, the metallic sheet 102 includes a first metallic material. The metallic article 106 includes a second metallic material. The second metallic material is different than the first metallic material. The first metallic material and the second metallic material being different enables the materials of metallic structure 100 to be tailored based on application and/or environmental conditions experienced by metallic sheet 102 and metallic article 106.

In one or more examples, the first metallic material of the metallic sheet 102 is titanium. In one or more examples, the second metallic material of the metallic article 106 is a titanium alloy.

In one or more examples, the metallic doubler 104 includes a third metallic material. The third metallic material is different than the first metallic material. The first metallic material and the third metallic material being different enables less expensive materials to be used for metallic doubler than those used for the metallic sheet.

In one or more examples, the metallic article 106 includes a fourth metallic material. The fourth metallic material is different than the second metallic material. The second metallic material and the fourth metallic material being different enables different materials to be used to form metallic article. As such, the metallic article 106 can be tailored based on application. In one or more examples, an additive manufacturing technique is used to fabricate the metallic article 106 having more than one metallic material.

Figure 2:
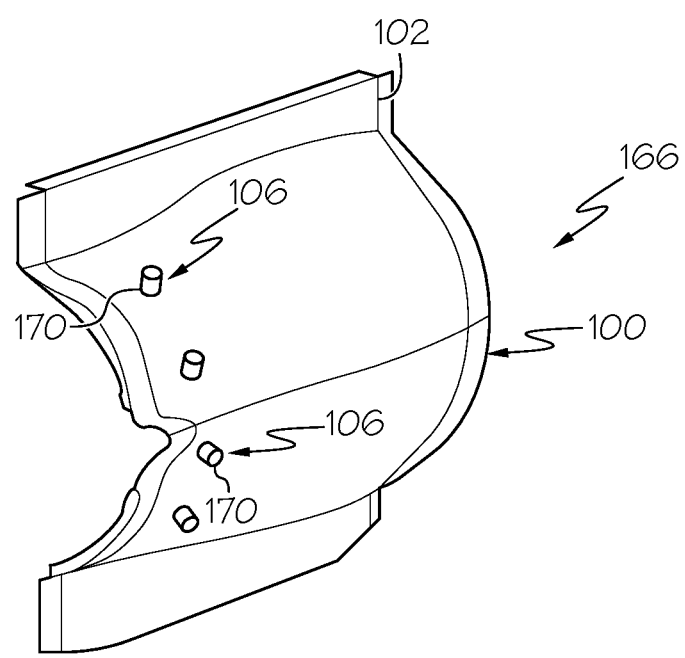
FIG. 2 is a schematic illustration of an example of a portion of the inner wall including the metallic structure, shown in FIG. 1.

Referring generally to FIG. 4 and particularly to FIGS. 1 and 2, in one or more examples, the metallic structure 100 is used to form at least a portion of an inner wall 166 of a fan duct 168, for example, of a propulsion system for an aircraft. For example, the metallic sheet 102 forms a portion of the inner wall 166 of the fan duct 168. The metallic article 106 forms a fitting 170 for connection of a structure to the inner wall 166 of the fan duct 168.

In one or more examples, the propulsion system is mounted to a strut or pylon beneath an aircraft wing. The propulsion system includes a turbine jet engine. In one or more examples, the jet engine is a turbofan engine. A typical turbofan engine includes a ducted fan and an engine core (or gas generator) for driving the fan. The fan moves a portion of intake air through the engine core (the core flow) and another portion of the intake air through the fan duct 168, which bypasses the engine core (the bypass or fan flow). The core flow is accelerated by a nozzle such as a plug nozzle. Thrust is produced by expelling the combination of the cooler bypass flow and the hotter core flow.

In one or more examples, the propulsion system includes a nacelle, which includes a cowling 208 for covering the ducted fan and the engine core. The cowling 208 serves as an aerodynamic fairing for the fan duct 168 and associated mechanisms.

In one or more examples, the nacelle includes the fan duct 168, which is also known as a thrust reverser. The fan duct 168 includes the inner wall 166, which separates the bypass flow from the engine core. The inner wall 166 incorporates structural capability to react flow pressure loads as well as other nacelle loads. The inner wall 166 may also function as a core duct for the core flow and as a cowling for the engine core. As an engine core cowling, the inner wall 166 provides the combination of significant structural capability, resistance to heat and its associated thermal gradients, noise attenuation, engine fire protection, and access to the engine and its systems and components. The inner wall 166 deflects heat from the engine core by conducting it into the bypass flow.

Rather than bolting on or manually welding pre-manufactured components onto the inner wall 166 of the fan duct 168, such components and/or features (e.g., the metallic article 106) can be additively manufactured directly onto a surface (e.g., the metallic-sheet second surface 110) of the inner wall 166. For example, the fittings 170 (e.g., the metallic articles 106) are additively manufactured directly onto the surface of the inner wall 166. This approach decreases weight and decreases parts count. Additionally, fasteners can be eliminated, which improves the integrity of the resulting fan duct 168. The complexity of the manufacturing process may also be reduced.

In one or more examples, the perforations 132 (e.g., shown in FIG. 20) are formed through metallic sheet 102 (and the second metallic sheet 120 when present) forming the inner wall 166 to allow bypass air to flow through the metallic sheet 102 and the second metallic sheet 120 when present and into the core of the metallic structure 100 formed by the webs 126 to attenuate engine noise.

Figure 3:
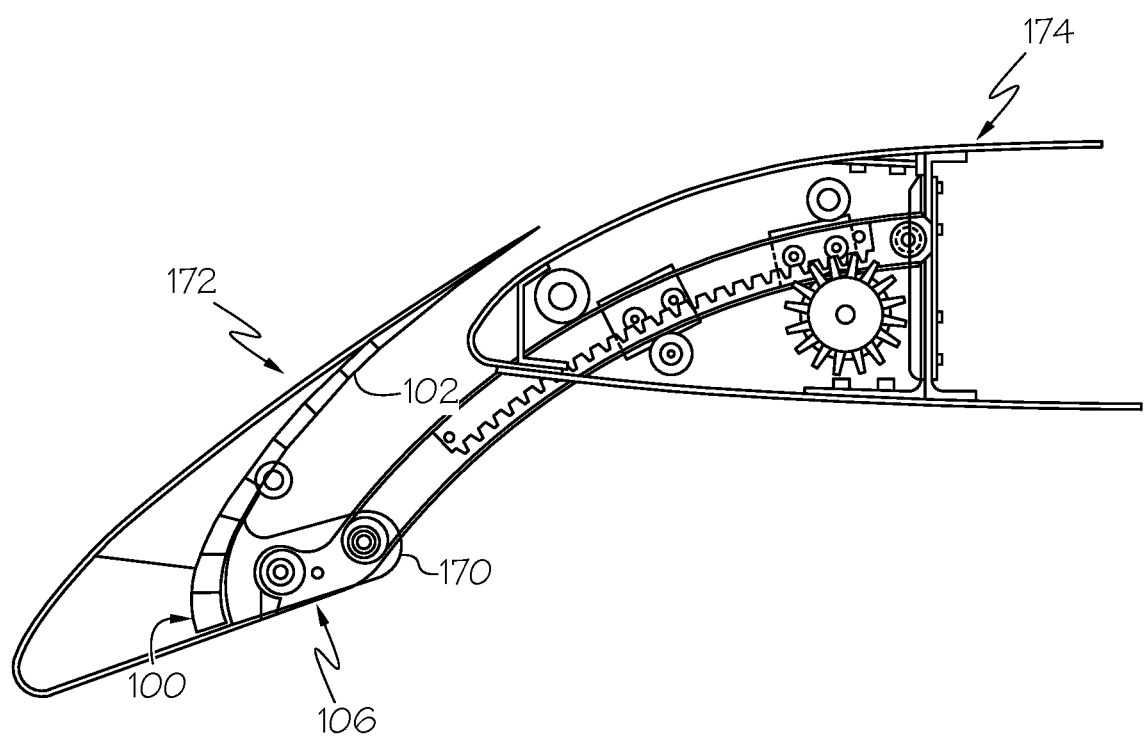
FIG. 3 is a schematic illustration, in section, of an example of a portion of an aircraft wing that includes a leading-edge slat including the metallic structure.

Referring generally to FIG. 4 and particularly to FIG. 3, in one or more examples, the metallic structure 100 is used to form at least a portion of a leading-edge slat 172 of an aircraft wing 174. For example, the metallic sheet 102 forms a portion of the leading-edge slat 172 of the aircraft wing 174. The metallic article 106 forms the fitting 170 for connection of a structure to the leading-edge slat 172.

Rather than bolting on or manually welding pre-manufactured components onto the leading-edge slat 172, such components and/or features (e.g., the metallic article 106) can be additively manufactured directly onto a surface (e.g., the metallic-sheet second surface 110) of the leading-edge slat 172. For example, the fittings 170 (e.g., the metallic articles 106) are additively manufactured directly onto the surface of the leading-edge slat 172. This approach decreases weight and decreases parts count. Additionally, fasteners can be eliminated, which improves the integrity of the resulting leading-edge slat 172. The complexity of the manufacturing process may also be reduced.

In one or more examples, the perforations 132 (e.g., shown in FIG. 20) are formed through metallic sheet 102 (and the second metallic sheet 120 when present) forming the leading-edge slat 172 to allow air to flow through the metallic sheet 102 and the second metallic sheet 120 and into the core of the metallic structure 100 formed by the webs 126 to attenuate aero-acoustic noise from the leading-edge slat 172.

Figure 32:
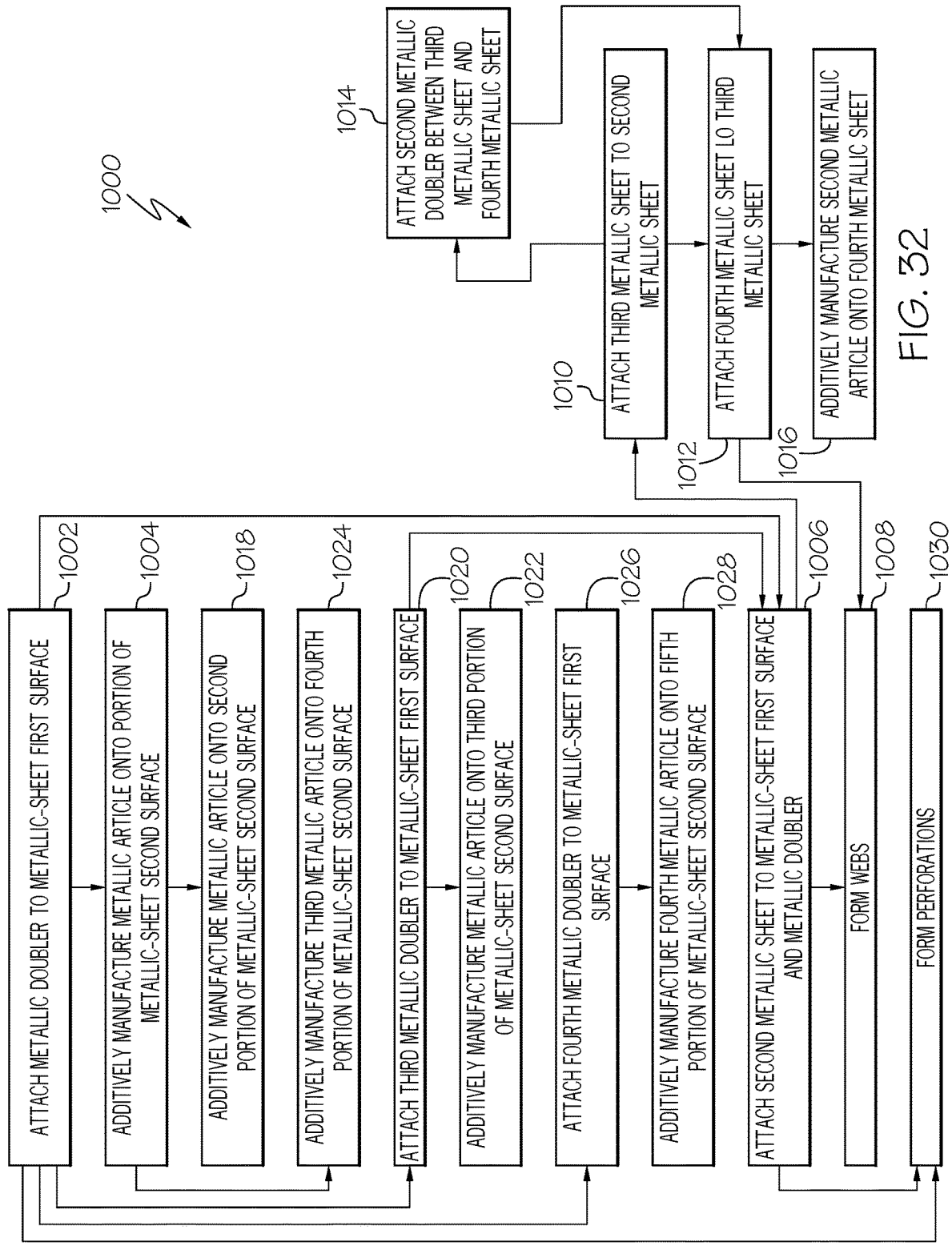
FIG. 32 is a flow diagram of an example of a method for fabricating the metallic structure.

Referring generally to FIGS. 1-31 and particularly to FIG. 32, by way of examples, the present disclosure is also directed to a method 1000 for fabricating the metallic structure 100.

Referring generally to FIGS. 4 and 32 and particularly to FIGS. 4-10, in one or more examples, the method 1000 includes a step of (block 1002) attaching the metallic doubler 104 to the portion of the metallic-sheet first surface 108 at the first junction 112. The method 1000 also includes a step of (block 1004) additively manufacturing the metallic article 106 onto the portion of the metallic-sheet second surface 110 at the second junction 116.

The first junction 112 has the first-junction area A1 and the first-junction boundary 114 that circumscribes and defines the first-junction area A1. The second junction 116 has the second-junction area A2 and the second-junction boundary 118 that circumscribes and defines the second-junction area A2. When viewed at any point along the second-junction boundary 118 in the direction, perpendicular to the metallic-sheet first surface 108, the second-junction boundary 118 does not extend outside of the first-junction boundary 114. In the plane P, intersecting the metallic doubler 104 and perpendicular to the metallic-sheet first surface 108, the metallic doubler 104 has at least the first doubler thickness DT1 and the second doubler thickness DT2, which is less than the first doubler thickness DT1.

Referring to FIGS. 5 and 6, in one or more examples, in the plane P, intersecting the metallic doubler 104 and perpendicular to the metallic-sheet first surface 108, the metallic article 106 has at least the first article thickness AT1 and the second article thickness AT2, which is less than the first article thickness AT1.

Referring to FIGS. 4 and 32, in one or more examples, according to the method 1000, the step of (1004) additively manufacturing the metallic article 106 onto the portion of the metallic-sheet second surface 110 at the second junction 116 includes a step of using a wirefeed directed-energy deposition additive manufacturing technique or a step of using a powder directed-energy deposition additive manufacturing technique to form the metallic article 106 on the metallic-sheet second surface 110.

Referring to FIGS. 4 and 32, in one or more examples, according to the method 1000, the step of (block 1002) attaching the metallic doubler 104 to the portion of the metallic-sheet first surface 108 at the first junction 112 includes a step of diffusion bonding the metallic doubler 104 and the metallic sheet 102 together.

Diffusion bonding provides a joint having the same mechanical and physical properties as the joined materials, produces a clean joint that is free from interface discontinuity and porosity, and provides good dimension tolerance and a low running cost. Additionally, both similar and dissimilar materials can be joined by the diffusion bonding process.

Referring to FIGS. 4 and 32, in one or more examples, the method 1000 includes a step of additively manufacturing the metallic doubler 104 before the step of (block 1002) attaching the metallic doubler 104 to the portion of the metallic-sheet first surface 108 at the first junction 112.

Additively manufacturing the metallic doubler 104 enables the geometry of metallic doubler 104 to be tailored to a desired application and/or for the geometry of the metallic article 106 to be additively manufactured on the metallic-sheet second surface 110.

In one or more examples, the metallic doubler 104 is manufacturing using other fabrication techniques. For example, the metallic doubler 104 is fabricated as a metallic laminate and the geometry of the metallic doubler 104 is tailored using one or more subtractive manufacturing techniques.

Referring generally to FIGS. 4 and 32 and particularly to FIG. 11, in one or more examples, the method 1000 includes a step of (1006) attaching the second metallic sheet 120 to the second portion of the metallic-sheet first surface 108 and to the metallic doubler 104. The metallic doubler 104 is sandwiched between the metallic sheet 102 and the second metallic sheet 120.

Referring to FIGS. 4 and 32, in one or more examples, according to the method 1000, the step of (block 1006) attaching the second metallic sheet 120 to the second portion of the metallic-sheet first surface 108 and to the metallic doubler 104 includes a step of diffusion bonding the second metallic sheet 120, the metallic doubler 104, and the metallic sheet 102 together.

Referring to FIGS. 4 and 32, in one or more examples, the method 1000 includes a step of (block 1008) forming webs 126 that extend from the second metallic sheet 120.

Referring to FIGS. 12 and 13, in one or more examples, according to the method 1000, the webs 126 are formed such that at least a portion of a cross-section of at least one of the webs 126 overlaps at least a portion of the second junction 116 when each point of at least the portion of the cross-section of at least the one of the webs 126 is viewed in the direction, perpendicular to the metallic-sheet first surface 108.

Referring generally to FIGS. 4 and 32 and particularly to FIGS. 15 and 16, in one or more examples, the method 1000 includes a step of (block 1010) attaching a portion of the third metallic sheet 128 to a portion of the second metallic sheet 120. The method 1000 includes a step of (block 1012) attaching at least a portion of the fourth metallic sheet 130 to at least a portion of the third metallic sheet 128. The method 1000 includes the step of (block 1008) forming the webs 126. The webs 126 extend between the second metallic sheet 120 and the third metallic sheet 128. The method 1000 uses superplastic forming so that the third metallic sheet 128 and the second metallic sheet 120 are spaced away from each other and the webs 126 are formed.

Referring to FIGS. 15, 16, 19, 20, 21 and 23, in one or more examples, the metallic structure 100 takes the form of the expanded sandwich structure that includes the honeycomb-like core situated (e.g., sandwiched) between a pair of outer face panels. The metallic sheet 102, the metallic doubler 104, and the second metallic sheet 120 form the first metallic face panel 122 (e.g., a first metallic laminate). The third metallic sheet 128 and the fourth metallic sheet 130 form the second metallic face panel 124 (e.g., a second metallic laminate) that is opposite, that is spaced away from, and that faces the first metallic face panel 122. The webs 126 extend between the first metallic face panel 122 and the second metallic face panel 124 and form the honeycomb-like core.

Referring to FIGS. 4 and 32, in one or more examples, according to the method 1000, the step of (block 1002) attaching the metallic doubler 104 to the portion of the metallic-sheet first surface 108 at the first junction 112 includes a step of diffusion bonding the metallic doubler 104 and the metallic sheet 102 together. The step of (block 1006) attaching the second metallic sheet 120 to the second portion of the metallic-sheet first surface 108 and to the metallic doubler 104 includes the step of diffusion bonding the second metallic sheet 120, the metallic doubler 104, and the metallic sheet 102 together. The step of (block 1012) attaching at least the portion of the fourth metallic sheet 130 to at least the portion of the third metallic sheet 128 includes the step of diffusion bonding the fourth metallic sheet 130 and the third metallic sheet 128 together.

Referring generally to FIGS. 4 and 32 and particularly to FIGS. 16-18, in one or more examples, the method 1000 includes a step of (block 1014) attaching the second metallic doubler 146 between the third metallic sheet 128 and the fourth metallic sheet 130 at the third junction 148. The method 1000 also includes a step of (block 1016) additively manufacturing the second metallic article 152 onto a portion of the fourth metallic sheet 130 at the fourth junction 154.

The third junction 148 has the third-junction boundary 150 that circumscribes and defines a third-junction area A3. The fourth junction 154 has the fourth-junction boundary 156 that circumscribes and defines the fourth-junction area A4. When viewed at any point along the fourth-junction boundary 156 in the direction, perpendicular to the fourth-metallic-sheet first surface 142, the fourth-junction boundary 156 does not extend outside the third-junction boundary 150. In the second plane P2, intersecting the second metallic doubler 146 and perpendicular to the fourth-metallic-sheet first surface 142, the second metallic doubler 146 has at least the third doubler thickness DT3 and the fourth doubler thickness DT4, which is less than the third doubler thickness DT3.

Referring generally to FIGS. 4 and 32 and particularly to FIGS. 21 and 22, in one or more examples, the method 1000 includes a step of (block 1018) additively manufacturing the metallic article 106 onto a second portion of the metallic-sheet second surface 110 at the fifth junction 176.

The fifth junction 176 has the fifth-junction boundary 178 that circumscribes and defines a fifth-junction area A5.

When viewed at any point along the fifth-junction boundary 178 in the direction, perpendicular to the metallic-sheet first surface 108, the fifth-junction boundary 178 does not extend outside the first-junction boundary 114.

Referring generally to FIGS. 4 and 32 and particularly to FIGS. 23-26, in one or more examples, the method 1000 includes a step of (block 1020) attaching the third metallic doubler 180 to the third portion of the metallic-sheet first surface 108 at the sixth junction 182. The method 1000 also includes a step of (block 1022) additively manufacturing the metallic article 106 to the third portion of the metallic-sheet second surface 110 at the seventh junction 186.

The sixth junction 182 has the sixth-junction boundary 184 that circumscribes and defines the sixth-junction area A6. The seventh junction 186 has the seventh-junction boundary 188 that circumscribes the seventh-junction area A7. When viewed at any point along the seventh-junction boundary 188 in the direction, perpendicular to the metallic-sheet first surface 108, the seventh-junction boundary 188 does not extend outside the sixth-junction boundary 184. In the third plane P3, intersecting the third metallic doubler 180 and perpendicular to the metallic-sheet first surface 108, the third metallic doubler 180 has at least the fifth doubler thickness DT5 and the sixth doubler thickness DT6, which is less than the fifth doubler thickness DT5.

Referring generally to FIGS. 4 and 32 and particularly to FIG. 27, in one or more examples, the method 1000 includes a step of (block 1024) additively manufacturing the third metallic article 190 to the fourth portion of the metallic-sheet second surface 110 at the eighth junction 192.

The eighth junction 192 has the eighth-junction boundary 194 that circumscribes and defines the eighth-junction area A8. When viewed at any point along the eighth-junction boundary 194 in the direction, perpendicular to the metallic-sheet first surface 108, the eighth-junction boundary 194 does not extend outside the first-junction boundary 114.

Referring generally to FIGS. 4 and 32 and particularly to FIGS. 28-30, in one or more examples, the method 1000 includes a step of (block 1026) attaching the fourth metallic doubler 196 to the fourth portion of the metallic-sheet first surface 108 at the ninth junction 198. The method 1000 includes a step of (block 1028) additively manufacturing the fourth metallic article 202 onto the fifth portion of the metallic-sheet second surface 110 at the tenth junction 204. The ninth junction 198 has the ninth-junction boundary 200 that circumscribes and defines the ninth-junction area A9. The tenth junction 204 has the tenth-junction boundary 206 that circumscribes and defines the tenth-junction area A10. When viewed at any point along the tenth-junction boundary 206 in the direction, perpendicular to the metallic-sheet first surface 108, the tenth-junction boundary 206 does not extend outside the ninth-junction boundary 200. In the fourth plane P4, intersecting the fourth metallic doubler 196 and perpendicular to the metallic-sheet first surface 108, the fourth metallic doubler 196 has at least the seventh doubler thickness DT7 and the eighth doubler thickness DT8, which is less than the seventh doubler thickness DT7.

Referring generally to FIGS. 4 and 32 and particularly to FIG. 20, in one or more examples, the method 1000 includes a step of (block 1030) forming the perforations 132 through the metallic sheet 102. The perforation 132 take the form of openings that attenuate noise by directing a flow of air passing over the metallic-sheet second surface 110 through the perforations 132. In one or more examples, the method 1000 also includes a step of forming the perforations 132 through the second metallic sheet 120.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-31, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-31, referred to above, need be included in every example and not all elements, features, and/or components described herein are necessarily depicted in each illustrative example. Accordingly, some of the elements, features, and/or components described and illustrated in FIGS. 1-31 may be combined in various ways without the need to include other features described and illustrated in FIGS. 1-31, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-31, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-31, and such elements, features, and/or components may not be discussed in detail herein with reference to each of FIGS. 1-31. Similarly, all elements, features, and/or components may not be labeled in each of FIGS. 1-31, but reference numerals associated therewith may be utilized herein for consistency.

In FIG. 32, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIG. 32 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the metallic structure 100 and the method 1000 have been shown and described, modifications may occur to those skilled in the art upon reading the specification. The present application includes such modifications and is limited only by the scope of the claims.

What is claimed is:
1. A metallic structure, comprising:
 a metallic sheet, comprising a metallic-sheet first surface and a metallic-sheet second surface, wherein the metallic-sheet first surface and the metallic-sheet second surface face in opposite directions;
 a metallic doubler, extending from a portion of the metallic-sheet first surface;
 a first junction between the portion of the metallic-sheet first surface and the metallic doubler;
 a metallic article, additively manufactured on or welded to a portion of the metallic-sheet second surface; and
 a second junction between the portion of the metallic-sheet second surface and the metallic article;
 wherein:
  the first junction has a first-junction area and a first-junction boundary that circumscribes and defines the first-junction area;
  the second junction has a second-junction area and a second-junction boundary that circumscribes and defines the second-junction area;
  when viewed at any point along the second-junction boundary in a direction, perpendicular to the metallic-sheet first surface, the second-junction boundary does not extend outside of the first-junction boundary;

in a plane, intersecting the metallic doubler and perpendicular to the metallic-sheet first surface, the metallic doubler has at least a first doubler thickness and a second doubler thickness, which is less than the first doubler thickness;

in the plane, intersecting the metallic doubler and perpendicular to the metallic-sheet first surface, the metallic article has at least a first article thickness and a second article thickness, which is less than the first article thickness; and in the plane, intersecting the metallic doubler and perpendicular to the metallic-sheet first surface, the first article thickness is disposed over the first doubler thickness and the second article thickness is disposed over the second doubler thickness.

2. The metallic structure according to claim 1, further comprising a second metallic sheet that comprises a second-metallic-sheet first surface and a second-metallic-sheet second surface, wherein:
the second-metallic-sheet first surface and the second-metallic-sheet second surface face in opposite directions;
a portion of the second-metallic-sheet first surface is in contact with a second portion of the metallic-sheet first surface; and
the metallic doubler is sandwiched between the metallic-sheet first surface and the second-metallic-sheet first surface.

3. The metallic structure according to claim 2, further comprising webs that extend from the second metallic sheet.

4. The metallic structure according to claim 3, wherein at least a portion of a cross-section of at least one of the webs overlaps at least a portion of the second junction when each point of at least the portion of the cross-section of at least the one of the webs is viewed in the direction, perpendicular to the metallic-sheet first surface.

5. The metallic structure according to claim 3, further comprising a third metallic sheet, spaced apart from the second metallic sheet and comprising a third-metallic-sheet first surface and a third-metallic-sheet second surface, wherein:
the third-metallic-sheet first surface and the third-metallic-sheet second surface face in opposite directions;
the second-metallic-sheet first surface and the third-metallic-sheet first surface face each other; and
the webs extend between the second metallic sheet and the third metallic sheet.

6. The metallic structure according to claim 5, further comprising a fourth metallic sheet, comprising a fourth-metallic-sheet first surface and a fourth-metallic-sheet second surface, wherein:
the fourth-metallic-sheet first surface and the fourth-metallic-sheet second surface face in opposite directions; and
at least a portion of the fourth-metallic-sheet first surface is in contact with at least a portion of the third-metallic-sheet second surface.

7. The metallic structure according to claim 6, further comprising:
a second metallic doubler, extending between a second portion of the third-metallic-sheet second surface and a second portion of the fourth-metallic-sheet first surface;

a third junction between the second portion of the fourth-metallic-sheet first surface and the second metallic doubler;
a second metallic article, extending from a portion of the fourth-metallic-sheet second surface; and
a fourth junction between the portion of the fourth-metallic-sheet second surface and the second metallic article;

wherein:
the third junction has a third-junction boundary that circumscribes and defines a third-junction area;
the fourth junction has a fourth-junction boundary that circumscribes and defines a fourth-junction area;
when viewed at any point along the fourth-junction boundary in a direction, perpendicular to the fourth-metallic-sheet first surface, the fourth-junction boundary does not extend outside the third-junction boundary; and
in a second plane, intersecting the second metallic doubler and perpendicular to the fourth-metallic-sheet first surface, the second metallic doubler has at least a third doubler thickness and a fourth doubler thickness, which is less than the third doubler thickness.

8. The metallic structure according to claim 7, wherein, in the second plane, intersecting the second metallic doubler and perpendicular to the fourth-metallic-sheet first surface, the second metallic article has at least a third article thickness and a fourth article thickness, which is less than the third article thickness.

9. The metallic structure according to claim 1, further comprising a fifth junction between a second portion of the metallic-sheet second surface and the metallic article, wherein:
the fifth junction has a fifth-junction boundary that circumscribes and defines a fifth-junction area; and
when viewed at any point along the fifth-junction boundary in the direction, perpendicular to the metallic-sheet first surface, the fifth-junction boundary does not extend outside the first-junction boundary.

10. The metallic structure according to claim 1, further comprising:
a third metallic doubler, extending from a third portion of the metallic-sheet first surface;
a sixth junction between the third portion of the metallic-sheet first surface and the third metallic doubler; and
a seventh junction between a third portion of the metallic-sheet second surface and the metallic article, wherein:
the sixth junction has a sixth-junction boundary that circumscribes and defines a sixth-junction area;
the seventh junction has a seventh-junction boundary that circumscribes and defines a seventh-junction area;
when viewed at any point along the seventh-junction boundary in a direction, perpendicular to the metallic-sheet first surface, the seventh-junction boundary does not extend outside the sixth-junction boundary; and
in a third plane, intersecting the third metallic doubler and perpendicular to the metallic-sheet first surface, the third metallic doubler has at least a fifth doubler thickness and a sixth doubler thickness, which is less than the fifth doubler thickness.

11. The metallic structure according to claim 1, further comprising:

a third metallic article, extending from a fourth portion of the metallic-sheet second surface; and an eighth junction between the fourth portion of the metallic-sheet second surface and the third metallic article, wherein;

the eighth junction has an eighth-junction boundary that circumscribes and defines an eighth-junction area; and when viewed at any point along the eighth-junction boundary in a direction, perpendicular to the metallic-sheet first surface, the eighth-junction boundary does not extend outside the first-junction boundary.

12. The metallic structure according to claim 1, further comprising:

a fourth metallic doubler, extending from a fourth portion of the metallic-sheet first surface;

a ninth junction between the fourth portion of the metallic-sheet first surface and the fourth metallic doubler;

a fourth metallic article, extending from a fifth portion of the metallic-sheet second surface; and a tenth junction between the fifth portion of the metallic-sheet second surface and the fourth metallic article, wherein:

the ninth junction has a ninth-junction boundary that circumscribes and defines a ninth-junction area;

the tenth junction has a tenth-junction boundary that circumscribes and defines a tenth-junction area;

when viewed at any point along the tenth-junction boundary in a direction, perpendicular to the metallic-sheet first surface, the tenth-junction boundary does not extend outside the ninth-junction boundary; and in a fourth plane, intersecting the fourth metallic doubler and perpendicular to the metallic-sheet first surface, the fourth metallic doubler has at least a seventh doubler thickness and an eighth doubler thickness, which is less than the seventh doubler thickness.

13. The metallic structure according to claim 1, wherein:
the metallic sheet forms a portion of an inner wall of a fan duct; and
the metallic article forms a fitting for connection of a structure to the inner wall of the fan duct.

14. The metallic structure according to claim 1, wherein:
the metallic sheet forms a portion of a leading-edge slat of an aircraft wing; and
the metallic article forms a fitting for connection of a structure to the leading-edge slat.

15. The metallic structure of claim 1, wherein, when viewed at any point along the second-junction boundary in the direction, perpendicular to the metallic-sheet first surface, at least one point on the second-junction boundary overlaps at least one point on the first-junction boundary.

16. A method for fabricating the metallic structure of claim 1, the method comprising steps of:
attaching the metallic doubler to the portion of the metallic-sheet first surface at the first junction; and
additively manufacturing the metallic article onto the portion of the metallic-sheet second surface at the second junction.

17. The method according to claim 16, further comprising a step of attaching a second metallic sheet to a second portion of the metallic-sheet first surface and to the metallic doubler,
wherein the metallic doubler is sandwiched between the metallic sheet and the second metallic sheet.

18. The method according to claim 16, further comprising attaching the metallic article to a second portion of the metallic-sheet second surface at a fifth junction,
wherein:
the fifth junction has a fifth-junction boundary that circumscribes and defines a fifth-junction area; and
when viewed at any point along the fifth-junction boundary in the direction, perpendicular to the metallic-sheet first surface, the fifth-junction boundary does not extend outside the first-junction boundary.

19. The method according to claim 16, further comprising:
attaching a third metallic doubler to a third portion of the metallic-sheet first surface at a sixth junction; and
attaching the metallic article to a third portion of the metallic-sheet second surface at a seventh junction,
wherein:
the sixth junction has a sixth-junction boundary that circumscribes and defines a sixth-junction area;
the seventh junction has a seventh-junction boundary that circumscribes a seventh-junction area;
when viewed at any point along the seventh-junction boundary in the direction, perpendicular to the metallic-sheet first surface, the seventh-junction boundary does not extend outside the sixth-junction boundary; and
in a third plane, intersecting the third metallic doubler and perpendicular to the metallic-sheet first surface, the third metallic doubler has at least a fifth doubler thickness and a sixth doubler thickness, which is less than the fifth doubler thickness.

20. The method according to claim 16, further comprising:
attaching a fourth metallic doubler to a fourth portion of the metallic-sheet first surface at a ninth junction; and
attaching a fourth metallic article to a fifth portion of the metallic-sheet second surface at a tenth junction,
wherein:
the ninth junction has a ninth-junction boundary that circumscribes and defines a ninth-junction area;
the tenth junction has a tenth-junction boundary that circumscribes and defines a tenth-junction area;
when viewed at any point along the tenth-junction boundary in the direction, perpendicular to the metallic-sheet first surface, the tenth-junction boundary does not extend outside the ninth-junction boundary; and
in a fourth plane, intersecting the fourth metallic doubler and perpendicular to the metallic-sheet first surface, the fourth metallic doubler has at least a seventh doubler thickness and an eighth doubler thickness, which is less than the seventh doubler thickness.

* * * * *